US012764300B2

(12) United States Patent
Liu et al.

(10) Patent No.: US 12,764,300 B2
(45) **Date of Patent: *Oct. 13, 2026**

(54) INTERACTION BETWEEN MV PRECISIONS AND MV DIFFERENCE CODING

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Jizheng Xu, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/806,808

(22) Filed: Aug. 16, 2024

(65) Prior Publication Data

US 2024/0406408 A1 Dec. 5, 2024

Related U.S. Application Data

(63) Continuation of application No. 17/389,200, filed on Jul. 29, 2021, now Pat. No. 12,081,767, which is a (Continued)

(30) Foreign Application Priority Data

Feb. 3, 2019 (WO) ................ PCT/CN2019/074681

(51) Int. Cl.
*H04N 19/139* (2014.01)
*H04N 19/176* (2014.01)
*H04N 19/51* (2014.01)

(52) U.S. Cl.
CPC ......... *H04N 19/139* (2014.11); *H04N 19/176* (2014.11); *H04N 19/51* (2014.11)

(58) Field of Classification Search
CPC .... H04N 19/139; H04N 19/176; H04N 19/46; H04N 19/51; H04N 19/52; H04N 19/523

(Continued)

(56) References Cited

U.S. PATENT DOCUMENTS 7,627,037 B2 12/2009 Li
8,340,177 B2 12/2012 Ji (Continued)

FOREIGN PATENT DOCUMENTS

CA 3070678 A1 1/2019
CN 101160970 A 4/2008

(Continued)

OTHER PUBLICATIONS

"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.

(Continued)

*Primary Examiner* — Behrooz M Senfi
(74) *Attorney, Agent, or Firm* — Conley Rose, P.C.

(57) ABSTRACT

Interaction between MV precisions and MV difference coding is described. In an exemplary aspect, a method for video processing includes determining, for a conversion between a first block of video and a bitstream representation of the first block, whether a symmetric motion vector difference (SMVD) mode for the first block is enabled or disabled and/or how to apply the SMVD mode for the first block, based on at least one of motion information, a motion vector (Continued)

difference (MVD) precision and a motion vector (MV) precision of the first block; and performing the conversion based on the determination.

18 Claims, 20 Drawing Sheets

Related U.S. Application Data continuation of application No. PCT/CN2020/074152, filed on Feb. 2, 2020.

(58) Field of Classification Search
USPC .................................................... 375/240.16
See application file for complete search history.

(56) References Cited

U.S. PATENT DOCUMENTS 8,374,238 B2 2/2013 Xiong
8,442,108 B2 5/2013 Song
9,247,246 B2 1/2016 Lu
9,294,777 B2 3/2016 Wang
9,521,425 B2 12/2016 Chen
9,525,861 B2 12/2016 Zhang
9,621,920 B2 4/2017 An
9,641,852 B2 5/2017 Lu
9,667,996 B2 5/2017 Chen
9,762,927 B2 9/2017 Chen
9,832,351 B1 11/2017 Schoenblum
9,838,712 B2 12/2017 Lin
10,158,884 B2 12/2018 Zhang
10,230,937 B2 3/2019 Lin
10,448,010 B2 10/2019 Chen
10,462,462 B2 10/2019 Chien
10,469,847 B2 11/2019 Xiu
10,491,917 B2 11/2019 Chen
10,523,964 B2 12/2019 Chuang
10,542,280 B2 1/2020 Sun
10,645,382 B2 5/2020 Zhang
10,701,366 B2 6/2020 Chen
10,764,592 B2 9/2020 Zhang
10,779,002 B2 9/2020 Chen
10,841,609 B1 11/2020 Liu
11,240,531 B2 2/2022 Liu
11,425,417 B2 8/2022 Liu
11,546,604 B2 1/2023 Luo
11,575,887 B2 * 2/2023 Zhang .................. H04N 19/136
11,689,747 B2 6/2023 Zhang
11,876,932 B2 1/2024 Liu
12,034,964 B2 * 7/2024 Liu ...................... H04N 19/159
12,081,767 B2 * 9/2024 Liu ...................... H04N 19/139
12,348,706 B2 7/2025 Zhang
2009/0003446 A1 1/2009 Wu
2009/0175334 A1 7/2009 Ye
2009/0207915 A1 8/2009 Yan
2009/0268823 A1 10/2009 Dane
2010/0157078 A1 6/2010 Atanassov
2010/0284466 A1 11/2010 Pandit
2011/0176611 A1 7/2011 Huang
2014/0022343 A1 1/2014 Chen
2014/0098851 A1 4/2014 Chen
2014/0286408 A1 9/2014 Zhang
2015/0085935 A1 3/2015 Chen
2015/0160390 A1 6/2015 Goyal
2015/0181216 A1 6/2015 Zhang
2015/0271524 A1 9/2015 Zhang
2015/0358599 A1 12/2015 Lin
2016/0073132 A1 3/2016 Zhang
2016/0080748 A1 3/2016 Sasai
2016/0100189 A1 4/2016 Pang
2016/0191931 A1 6/2016 Hannuksela
2017/0105018 A1 4/2017 Wu
2017/0230662 A1 8/2017 Nishitani
2017/0332095 A1 11/2017 Zou et al.
2017/0339405 A1 11/2017 Wang
2017/0372494 A1 12/2017 Zhu
2018/0014017 A1 1/2018 Li
2018/0041769 A1 2/2018 Chuang
2018/0070105 A1 3/2018 Jin et al.
2018/0084260 A1 3/2018 Chien
2018/0091816 A1 3/2018 Chien
2018/0098089 A1 4/2018 Chen
2018/0184083 A1 6/2018 Panusopone et al.
2018/0184117 A1 6/2018 Chen
2018/0192071 A1 7/2018 Chuang
2018/0199057 A1 7/2018 Chuang
2018/0241998 A1 8/2018 Chen
2018/0249154 A1 8/2018 Chuang et al.
2018/0262773 A1 9/2018 Chuang
2018/0278949 A1 * 9/2018 Karczewicz ......... H04N 19/577
2018/0278950 A1 9/2018 Chen
2018/0316929 A1 11/2018 Li
2018/0324417 A1 11/2018 Karczewicz et al.
2018/0332298 A1 11/2018 Liu
2018/0359483 A1 12/2018 Chen
2019/0020895 A1 1/2019 Liu
2019/0037223 A1 1/2019 Chang
2019/0037231 A1 1/2019 Ikai
2019/0045192 A1 2/2019 Socek
2019/0045215 A1 2/2019 Chen
2019/0058896 A1 2/2019 Huang et al.
2019/0132606 A1 5/2019 Su
2019/0208204 A1 7/2019 Tourapis
2019/0222848 A1 7/2019 Chen
2019/0230350 A1 7/2019 Chen
2019/0273937 A1 9/2019 Yu
2019/0306502 A1 10/2019 Gadde
2019/0320199 A1 10/2019 Chen
2019/0349580 A1 11/2019 Li
2020/0029091 A1 1/2020 Chien
2020/0036997 A1 1/2020 Li
2020/0045310 A1 2/2020 Chen
2020/0128258 A1 4/2020 Chen
2020/0169748 A1 5/2020 Chen
2020/0213594 A1 7/2020 Liu
2020/0213612 A1 7/2020 Liu
2020/0221117 A1 7/2020 Liu
2020/0244979 A1 7/2020 Li
2020/0296405 A1 9/2020 Huang
2020/0344475 A1 10/2020 Zhu
2020/0359029 A1 11/2020 Liu
2020/0366928 A1 11/2020 Liu
2020/0374544 A1 11/2020 Liu
2020/0382795 A1 12/2020 Zhang
2020/0396453 A1 12/2020 Zhang
2021/0029362 A1 1/2021 Liu
2021/0029364 A9 1/2021 Yu
2021/0051339 A1 2/2021 Liu
2021/0076063 A1 3/2021 Liu
2021/0092413 A1 3/2021 Tsukuba
2021/0092435 A1 3/2021 Liu
2021/0160511 A1 5/2021 Zhang
2021/0160533 A1 5/2021 Zhang
2021/0218985 A1 7/2021 Liu
2021/0227209 A1 7/2021 Liu
2021/0235073 A1 7/2021 Liu
2021/0235074 A1 7/2021 Liu
2021/0235109 A1 7/2021 Liu
2021/0235110 A1 7/2021 Liu
2021/0258598 A1 8/2021 Hendry
2021/0266587 A1 8/2021 Liu
2021/0274208 A1 9/2021 Zhang
2021/0274211 A1 9/2021 Liu
2021/0274212 A1 9/2021 Liu
2021/0289216 A1 9/2021 Liu
2021/0344909 A1 11/2021 Liu
2021/0360256 A1 11/2021 Liu
2021/0368172 A1 11/2021 Lim
2021/0368181 A1 11/2021 Liu
2021/0377559 A1 12/2021 Liu

(56) References Cited

U.S. PATENT DOCUMENTS

| | | | | |
|---|---|---|---|---|
| 2021/0377561 | A1 | 12/2021 | Zhang | |
| 2021/0385499 | A1 | 12/2021 | Zhang | |
| 2021/0392327 | A1 | 12/2021 | Zhang | |
| 2022/0007047 | A1 | 1/2022 | Zhang | |
| 2022/0007048 | A1 | 1/2022 | He | |
| 2022/0038681 | A1 | 2/2022 | Galpin | |
| 2022/0060692 | A1 | 2/2022 | Zhang | |
| 2022/0078488 | A1* | 3/2022 | Leleannec | H04N 19/52 |
| 2022/0094940 | A1 | 3/2022 | Bandyopadhyay | |
| 2022/0116650 | A1 | 4/2022 | Liu | |
| 2022/0217410 | A1 | 7/2022 | Wang | |
| 2022/0256196 | A1 | 8/2022 | Wang | |
| 2023/0125740 | A1 | 4/2023 | Luo | |

FOREIGN PATENT DOCUMENTS

| | | | |
|---|---|---|---|
| CN | 102215386 | A | 10/2011 |
| CN | 102970543 | A | 3/2013 |
| CN | 103202021 | A | 7/2013 |
| CN | 103907346 | A | 7/2014 |
| CN | 103918266 | A | 7/2014 |
| CN | 104170381 | A | 11/2014 |
| CN | 104221384 | A | 12/2014 |
| CN | 104247432 | A | 12/2014 |
| CN | 104471943 | A | 3/2015 |
| CN | 104813671 | A | 7/2015 |
| CN | 105103556 | A | 11/2015 |
| CN | 105187824 | A | 12/2015 |
| CN | 105247869 | A | 1/2016 |
| CN | 105325003 | A | 2/2016 |
| CN | 105900420 | A | 8/2016 |
| CN | 106688232 | A | 5/2017 |
| CN | 106797476 | A | 5/2017 |
| CN | 106888379 | A | 6/2017 |
| CN | 107027339 | A | 8/2017 |
| CN | 107113425 | A | 8/2017 |
| CN | 107431820 | A | 12/2017 |
| CN | 107690810 | A | 2/2018 |
| CN | 107710764 | A | 2/2018 |
| CN | 108028939 | A | 5/2018 |
| CN | 108141582 | A | 6/2018 |
| CN | 108293131 | A | 7/2018 |
| CN | 108432250 | A | 8/2018 |
| CN | 108848376 | A | 11/2018 |
| CN | 109417631 | A | 3/2019 |
| CN | 110115032 | A | 8/2019 |
| CN | 113424533 | B | 9/2024 |
| EP | 3939311 | A1 | 1/2022 |
| GB | 201509938 | | 7/2015 |
| IN | 201847037754 | A | 11/2018 |
| IN | 538600 | | 5/2024 |
| JP | 2008236402 | A | 10/2008 |
| JP | 2020017970 | A | 1/2020 |
| JP | 2022520825 | A | 4/2022 |
| JP | 7556090 | B2 | 9/2024 |
| TW | 201830968 | A | 8/2018 |
| WO | 2007108661 | A1 | 9/2007 |
| WO | 2017036414 | A1 | 3/2017 |
| WO | 2017118409 | A1 | 7/2017 |
| WO | 2018048265 | A1 | 3/2018 |
| WO | 2018113658 | A1 | 6/2018 |
| WO | 2018117546 | A1 | 6/2018 |
| WO | 2018119167 | A1 | 6/2018 |
| WO | 2018121506 | A1 | 7/2018 |
| WO | 2018156628 | A1 | 8/2018 |
| WO | 2018169923 | A1 | 9/2018 |
| WO | 2018175638 | A1 | 9/2018 |
| WO | 2018175720 | A1 | 9/2018 |
| WO | 2018175756 | A1 | 9/2018 |
| WO | 2018199050 | A1 | 11/2018 |
| WO | 2018237303 | A1 | 12/2018 |
| WO | 2019072595 | A1 | 4/2019 |
| WO | 2019129130 | A1 | 7/2019 |
| WO | 2020189893 | A1 | 9/2020 |

OTHER PUBLICATIONS

Rosewarne et al. "High Efficiency Video Coding (HEVC) Test Model 16 (HM 16) Improved Encoder Description Update 7," Joint Collaborative Team on Video Coding (JCT-VG) ITU-T SG 16 WP3 and ISO/IEC JTC1/SC29/WG11, 25th Meeting, Chengdu, CN, Oct. 14-21, 2016, document JCTVC-Y1002, 2016.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVETG1001, 2017.

JEM-7.0: https://jvet.hhi.fraunhofer.de/svn/svn_HMJEMSoftware/tags/ HM-16.6-JEM-7.0, Oct. 19, 2021.

Han et al. "CE4.1.3: Affine Motion Compensation Prediction," Joint Video Exploration Team (JVET) of ITU-T SG 16 WP 3 and ISO/IEC JTC 1/SC 29/WG 11, 11th meeting, Ljubljana, SI, Jul. 10-18, 2018, document JVET-K0337, 2018.

Chen et al. "CE4: Symmetrical MVD Mode {Test 4.4.3)," Joint Video Experts Team {JVET) of ITU-T SG 16 WP 3 and ISO/IEC JTC 1/SC 29/WG 11, 13th Meeting, Marrakech, MA Jan. 9-18, 2019, document JVET-M0481, 2019.

Luo et al. "CE2-related: Symmetric MVD for Affine Bi-prediction Coding," Joint Video Experts Team (JVET)of ITU-T SG 16 WP 3 and ISO/IEC JTC 1/SC 29/WG 11, 13th Meeting: Marrakech, MA, Jan. 9-18, 2019, document JVET-M0467, Jan. 2019.

Bross et al. "Versatile Video Coding (Draft 2)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1001, 2018.

Chen et al. "AHG 19: Adaptive Resolution Change," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0279, 2019.

Chen et al. "CE4: Separate List for Sub-Block Merge Candidates (Test 4.2.8)," Joint Video Experts Team (JVET) of ITU-T SG 16 WP 3 and ISO/IEC JTC 1/SC 29/WG 11, 12th Meeting, Macao, CN, Oct. 3-12, 2018, JVET-L0369, 2018.

Chen et al. "Crosscheck of JVET-L0142 (CE4: Simplification of the Common Base for Affine Merge (Test 4.2.6))," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0632, 2018.

Chen et al., "CE4: Affine Merge Enhancement with Simplification (Test 4.2.2)," Joint Video Experts Team (JVET) of ITUT SG 16 WP 3 and ISO/IEC JTC 1/SC 29/WG 11, 12th Meeting, Macao, CN, 3-12, Oct. 2018, document JVET-L0368, 2018.

Chiang et al. "CE10.1.1: Multi-Hypothesis Prediction for Improving AMVP Mode, Skip or Merge Mode, and Intra Mode," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0100, 2018.

Davies, Thomas. "AHG18: Design Considerations for Adaptive Resolution Coding (ARC)," Joint Collaborative Team on Video Coding (JCT-VC) of ITU-T SG16 WP3 and ISO/IEC JTC1/SC29/WG11 8th Meeting: San Jose, CA, USA, Feb. 1-10, 2012, document JCTVC-H0234, 2012.

Davies, Thomas. "Resolution Switching for Coding Efficiency and Resilience," Joint Collaborative Team on Video Coding (JCT-VC) of ITU-T SG16 WP3 and ISO/IEC JTC1/SC29/WG11 6th Meeting: Turin, IT, Jul. 14-22, 2011, document JCTVC-F158, 2011.

Hannuksela et al. "AHG12: On Grouping of Tiles," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0261, 2019.

Hannuksela et al. "AHG12: Sub-Picture Layers for Realizing Independently Coded Picture Regions," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0045, 2019.

Hannuksela et al. "AHG19: On Adaptive Resolution Changing," Joint Video Experts Team (JVET) of ITU-T SG 16 WP 3 and

(56) References Cited

OTHER PUBLICATIONS

ISO/IEC JTC 1/SC 29/WG 11 14th Meeting: Geneva, CH, Mar. 19-27, 2019, document JVET-N0048, 2019.
Hannuksela et al. "Use Cases and Proposed Design Choices for Adaptive Resolution Changing (ARC)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0259, 2019.
Hendry et al. "AHG19: Adaptive Resolution Change (ARC) Support in VVC," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0118, 2019.
Hendry et al. "On Adaptive Resolution Change (ARC) for VVC," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0135, 2019.
https://vcgit.hhi.fraunhofer.de/jvet/VVCSoftware_VTM/tags/VTM-2.1, Aug. 28, 2023.
Hu et al. "CE5: Coding Tree Block Based Adaptive Loop Filter (CE5-4)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0415, 2019.
"Information Technology—High Efficiency Coding and Media Delivery in Heterogeneous Environments—Part 2: High Efficiency Video Coding," Apr. 20, 2018, ISO/DIS 23008, 4th Edition.
Jeong et al. "CE4 Ultimate Motion Vector Expression (Test 4.5.4)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0054, 2018.
Bossen et al. AHG Report: Test Model Software Development (AHG3) Joint Video Experts Team (JVET) of ITU-T SG 16 WP 3 and ISO/IEC JTC 1/SC 29/WG 11 12th Meeting, Macao, CN, Oct. 3-12, 2018, document JVET-L0003, 2018.
Bross et al. "Versatile Video Coding (Draft 3)," Joint Video Experts Team (JVET) of ITU-T SG 16 WP 3 and ISO/IEC JTC 1/SC 29/WG 1112th Meeting: Macao, CN, Oct. 3-12, 2018, document JVET-L1001, 2018.
Yu et al. "CE2-Related: ATMVP Simplification," Joint Video Experts Team (JVET) of ITU-T SG 16 WP 3 and ISO/IEC JTC 1/SC 29/WG 11 13th Meeting, Marrakech, MA Jan. 9-18, 2019, document JVET-M0116, 2019.
Sethuraman, Sriram. "CE9: Results of DMVR Related Tests CE9. 2.1 and CE9.2.2," Joint Video Experts Team 26 (JVET) of ITU-T SG 16 WP 3 and ISO/IEC JTC 1/SC 29/WG 11, 13th Meeting, Marrakech, MA, Jan. 9-18, 2019, document JVET-M0147, 2019.
JVET-M0171-v1-Chen et al. "CE4-Related: MMVD Cleanups," Joint Video Experts Team (JVET) of ITU-T SG 16 WP 3 and ISO/IEC JTC 1/SC 29/WG 11 13th Meeting: Marrakech, MA, Jan. 9-18, 2019.
JVET-M0223-v4-Sethuraman, Sriram, "Non-CE9: Co-Existence Analysis for DMVR with BDOF," Joint Video Experts Team (JVET) of ITU-T SG 16 WP 3 and ISO/IEC JTC 1/SC 29/WG 11, 13th Meeting, Marrakech, MA, Jan. 9-18, 2019.
JVET-N0815-Esenlik et al. "BoG Report on CE9 Decoder Motion Vector Derivation Related Contributions," Joint Video Experts Team (JVET) of ITU-T SG 16 WP 3 and ISO/IEC JTC 1/SC 29/WG 11, 14th Meeting, Geneva, CH, Mar. 19-27, 2019.
Bross et al. "Versatile Video Coding (Draft 6)," Joint Video Experts Team (JVET) of ITU-T SG 16 WP 3 and ISO/IEC JTC 1 /SC 29/WG 11 15th Meeting: Gothenburg, SE Jul. 3-12, 2019, document JVET-O2001, 2019.
Xiu et al. "CE4: Harmonization of BDOF and PROF (Test 4-2.1 and 4-2.2)," Joint Video Experts Team (JVET) of ITU-T SG 16 WP 3 and ISO/IEC JTC 1/SC 29/WG 11 16th Meeting, Geneva, CH, Oct. 1-11, 2019, document JVET-P0057, 2019.
Wan et al. "AHG17: Picture Header," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0239, 2019.
Wan et al. "AHG17: Text for Picture Header," Joint Video Experts Team (JVET)of ITU-T SG 16 WP 3 and ISO/IEC JTC 1/SC 29/WG 1116th Meeting: Geneva, CH, Oct. 1-11, 2019, document JVET-P1006, 2019.
Lee et al. "CE4: Simplification of the Common Base for Affine Merge (Test 4.2.2)," Joint Video Experts Team (JVET) of ITU-T SG 16 WP 3 and ISO/IEC JTC 1/SC 29/WG 11, 12th Meeting, Macau, CN, Oct. 8-12, 2012, document JVET-L0142, 2018.
Liu et al. "CE9-Related: Simplification of Decoder Side Motion Vector Derivation," Joint Video Experts Team (JVET) of ITU-T SG 16 WP 3 and ISO/IEC JTC 1/SC 29/WG 11 11th Meeting, Ljubljana, SI, Jul. 10-18, 2018, document JVETK0105, 2018.
Wenger et al. "[AHG19] On Signaling of Adaptive Resolution Change," Joint Video Experts Team (JVET) of ITU-T SG 16 WP 3 and ISO/IEC JTC 1/SC 29/WG 11 14th Meeting: Geneva, CH, Mar. 19-27, 2019, document JVET- □ N0052, 2019.
Yang et al. "Description of Core Experiment 4 (CE4): Inter Prediction and Motion Vector Coding," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVE-K1024, 2018.
Chen et al. "Algorithm Description for Versatile Video Coding and Test Model 5 (VTM 5)," Joint Video Exploration Team (JVET) of ITU-T SG 16 WP 3 and ISO/IEC JTC 1/SC 29/WG 11, 14th Meeting: Geneva, CH, Mar. 19-27, 2019, document JVET-N1002, 2019.
Luo et al. "CE2-related: Prediction Refinement with Optical Flow for Affine Mode," Joint Video Experts Team (JVET) of ITU-T SG 16 WP 3 and ISO/IEC JTC 1/SC 29/WG 11 14th Meeting: Geneva, CH, Mar. 19-27, 2019, document: JVET-N0236, 2019.
Filippov et al. "Non-CE4/AHG17: On Slice-Level Syntax for BDOF and DMVR," Joint Video Experts Team (JVET) of ITU-T SG 16WP 3 and ISO/IECJTC 1/SC 29/WG 11 16th Meeting: Geneva, CH, Oct. 1-11, 2019, document: JVET-P0320, 2019.
Document: JVET-L0256-v2, Xiu, X., et al., "CE9-related: Complexity reduction and bit-width control for bi-directional optical flow (BIO)," Joint Video Experts Team (JVET) of ITU-T SG 16WP 3 and ISO/IEC JTC 1/SC 29/WG 11 12th Meeting: Macao, CN, Oct. 3-12, 2018.
Document: JVET-P0409-v1, Chen, J., et al., "CE1-related: Enable PROF for RPR," Joint Video Experts Team (JVET) of ITU-T SG 16 WP 3 and ISO/IEC JTC 1/SC 29/WG 11 16th Meeting: Geneva, CH, Oct. 1-11, 2019, 7 pages.
Enhanced AMVP Mechanism Based Adaptive Motion Search Range For Fast HEVC Coding, Wei-Chien, IEEE, 2014.
JVET-L0173-Sethuraman, Sriram. "CE9: Results of Tests 9.1.4, 9.2.4, 9.2.5, and 9.2.6," Joint Video Experts Team (JVET) of ITU-T SG 16 WP 3 and ISO/IEC JTC 1/SC 29/WG 11, 12th Meeting, Macao, CN, Oct. 3-12, 2018.
Extended European Search Report from European Patent Application No. 20755475.9 dated Mar. 23, 2022 (11 pages).
Extended European Search Report from European Patent Application No. 20805395.9 dated May 10, 2022 (8 pages).
Extended European Search Report from European Patent Application No. 20873612.4 dated Oct. 25, 2022 (7 pages).
Document: JVET-N0118-v3, Hendry, et al., "AHG19: Adaptive resolution change (ARC) support in VVC", Joint Video Experts Team (JVET) of ITU-T SG 16 WP 3 and ISO/IEC JTC 1/SC 29/WG 11 14th Meeting: Geneva, CH, Mar. 19-27, 2019, 8 pages.
Document: JVET-L0120-v2, Abe, K., et al., "CE4-related: Low pipeline latency LIC", Joint Video Exploration Team (JVET) of ITU-T SG 16 WP 3 and ISO/IEC JTC 1/SC 29/WG 11 12th Meeting: Macao, CN, Oct. 3-12, 2018, 5 pages.
Chinese Office Action from Chinese Patent Application No. 202080035365.1 dated Feb. 19, 2025, 23 pages.
Chinese Office Action from Chinese Patent Application No. 202080000731.X dated Mar. 18, 2025, 24 pages.
Chinese Office Action from Chinese Patent Application No. 202080012359.4 dated Mar. 31, 2025, 21 pages.
Document: JVET-J1029_r1, Esenlik, S., et al., "Description of Core Experiment 9 (CE9): Decoder Side Motion Vector Derivation,"

(56) References Cited

OTHER PUBLICATIONS

Joint Video Exploration Team (JVET) of ITU-T SG16 WP 3 and ISO/IEC JTC 1/SC 29/WG 11 10th Meeting: San Diego, US, Apr. 10-20, 2018, 35 pages.
Document: JVET-L1002-v1, Chen, J., et al., "Algorithm description for Versatile Video Coding and Test Model 3 (VTM 3)," Joint Video Experts Team (JVET) of ITU-T SG 16 WP 3 and ISO/IEC JTC 1/SC 29/WG 11 12th Meeting: Macao, CN, Oct. 3-12, 2018, 48 pages.
Japanese Notice of Allowance from Japanese Patent Application No. 2023-063135 dated Aug. 13, 2024, 6 pages.
Document: JVET-L1002-v1, Chen, J., et al., "CE4: Summary report on inter prediction and motion vector coding," Joint Video Experts Team (JVET) of ITU-T SG 16 WP 3 and ISO/IEC JTC 1/SC 29/WG 11 12th Meeting: Macao, CN, Oct. 3-12, 2018, 48 pages.
Document: JVET-L0256-v2, Xiaoyu, X., et al., "CE9-related: Complexity reduction and bit-width control for bi-directional optical flow (310)," Joint Video Experts Team (JVET) of ITU-T SG 16 WP 3 and ISO/IEC JTC 1/SC 29/WG 11 12th Meeting: Macao, CN, Oct. 3-12, 2018, 13 pages.
DIV2K Dataset : DIVerse 2K Resolution High Quality Images as Used for the Challenges @ Ntire CVPR 2017 and CVPR, 2018, 6 pages.
Document: JVET-K0342-v1, Xiu, X., et al., "CE9.1.3: Complexity reduction on decoder-side motion vector refinement (DMVR)," Joint Video Experts Team (JVET) of ITU-T SG 16 WP 3 and ISO/IEC JTC 1/SC 29/WG 11 11th Meeting: Ljubljana, SI, Jul. 10-18, 2018, 2 pages.
Document: JVET-K0480-v1, Zhou,. M., et al., "Non-CE9: A computational complexity analysis for DMVR," Joint Video Experts Team (JVET) of ITU-T SG 16 WP 3 and ISO/IEC JTC 1/SC 29/WG 11 11th Meeting: Ljubljana, SI, Jul. 10-18, 2018, 4 pages.
Document: JVET-L0100-v1, Chiang, M-S., et al., "CE10.1.1: Multi-hypothesis prediction for improving AMVP mode, skip or merge mode, and intra mode," Joint Video Experts Team (JVET) of ITU-T SG 16 WP 3 and ISO/IEC JTC 1/SC 29/WG 11 12th Meeting: Macao, CN, Oct. 3-12, 2018, 13 pages.
Document: JVET-L0100-v3, Chiang, M., et al., "CE10.1.1: Multi-hypothesis prediction for improving AMVP mode, skip or merge mode, and intra mode," Joint Video Experts Team (JVET) of ITU-T SG 16 WP 3 and ISO/IEC JTC 1/SC 29/WG 11 12th Meeting: Macao, CN, Oct. 3-12, 2018, 14 pages.
Document: JVET-L1001-v9, Bross, B., et al., "Versatile Video Coding (Draft 3)," Joint Video Experts Team (JVET) of ITU-T SG 16 WP 3 and ISO/IEC JTC 1/SC 29/WG 11 12th Meeting: Macao, CN, Oct. 3-12, 2018, 193 pages.
Document: JVET-L1002-v2, Chen, J., et al., "CE4: Summary report on inter prediction and motion vector coding," Joint Video Experts Team (JVET) of ITU-T SG 16 WP 3 and ISO/IEC JTC 1/SC 29/WG 11 12th Meeting: Macao, CN, Oct. 3-12, 2018, 48 pages.
Document: JVET-M0467-v2, Luo, J., et al., "CE2-related: Symmetric MVD for Affine Bi-prediction Coding," Joint Video Experts Team (JVET) of ITU-T SG 16 WP 3 and ISO/IEC JTC 1/SC 29/WG 11 13th Meeting: Marrakech, MA, Jan. 9-18, 2019, 3 pages.
Document: JVET-N1002-v2, Chen, J., et al., "Algorithm description for Versatile Video Coding and Test Model 5 (VTM 5)," Joint Video Experts Team (JVET) of ITU-T SG 16 WP 3 and ISO/IEC JTC 1/SC 29/WG 11 14th Meeting: Geneva, CH, Mar. 19-27, 2019, 79 pages.
Document: JVET-P0320-v1, Filippov, A., et al., "Non-CE4/AHG17: On slice-level syntax for BDOF and DMVR," Joint Video Experts Team (JVET) of ITU-T SG 16 WP 3 and ISO/IEC JTC 1/SC 29/WG 11 16th Meeting: Geneva, CH, Oct. 1-11, 2019, 2 pages.
Document: JVET-L0142-v3, Lee, J., et al., "CE4: Simplification of the Common Base for Affine Merge (Test 4.2.6)," Joint Video Experts Team (JVET) of ITU-T SG 16 WP 3 and ISO/IEC JTC 1/SC 29/WG 11 12th Meeting: Macau, CN, Oct. 8-12, 2018, 6 pages.
Document: JVET-K0105-v2, Liu, H., et al., "CE9-related: Simplification of Decoder Side Motion Vector Derivation," Joint Video Experts Team (JVET) of ITU-T SG 16 WP 3 and ISO/IEC JTC 1/SC 29/WG 11 11th Meeting: Ljubljana, SI, Jul. 10-18, 2018, 3 pages.
Document: JVET-M0146-v1, Hanhart, P., et al., "Non-CE3: MDLM template downsampling," Joint Video Experts Team (JVET) of ITU-T SG 16 WP 3 and ISO/IEC JTC 1/SC 29/WG 11 13th Meeting: Marrakech, MA, Jan. 9-18, 2019, 4 pages.
Document: JVET-P0239-v1, Wan, W., et al., "AHG17: Picture Header," Joint Video Experts Team (JVET) of ITU-T SG 16 WP 3 and ISO/IEC JTC 1/SC 29/WG 11 16th Meeting: Geneva, CH, Oct. 1-11, 2019, 9 pages.
Document: JVET-L0256-v3, Xiaoyu, X., et al., "CE9-related: Complexity reduction and bit-width control for bi-directional optical flow (310)," Joint Video Experts Team (JVET) of ITU-T SG 16 WP 3 and ISO/IEC JTC 1/SC 29/WG 11 12th Meeting: Macao, CN, Oct. 3-12, 2018, 15 pages.
Chinese Notice of Allowance from Chinese Patent Application No. 202080000731.X dated Jun. 9, 2025, 5 pages.
Chinese Notice of Allowance from Chinese Patent Application No. 202080013609.6 dated Jun. 30, 2025, 7 pages.
Chinese Notice of Allowance from Chinese Patent Application No. 202080035365.1 dated Jul. 1, 2025, 27 pages.
Document: JVET-N0024-v2, Yang, H., et al., "CE4: Summary report on inter prediction and motion vector coding," Joint Video Experts Team (JVET) of ITU-T SG 16 WP 3 and ISO/IEC JTC 1/SC 29/WG 11 14th Meeting: Geneva, CH, Mar. 19-27, 2019, 21 pages.
Document: JVET-N0153, Yu, R., et al., "Non-CE9: On DMVR and GBI," Joint Video Experts Team (JVET) of ITU-T SG 16 WP 3 and ISO/IEC JTC 1/SC 29/WG 11 14th Meeting: Geneva, CH, Mar. 19-27, 2019, 3 pages.
Document: JVET-N0146-v1, Chujoh, T., et al., "Non-CE9: On conditions for DMVR and BDOF," Joint Video Experts Team (JVET) of ITU-T SG 16 WP 3 and ISO/IEC JTC 1/SC 29/WG 11 14th Meeting: Geneva, CH, Mar. 19-27, 2019, 5 pages.
Chinese Office Action from Chinese Patent Application No. 202080000731.X dated Oct. 24, 2024, 9 pages.
Examination Report from Indian Patent Application No. 202147036782 dated Mar. 21, 2022 (6 pages).
International Search Report and Written Opinion from International Patent Application No. PCT/CN2020/075226 dated May 8, 2020 (10 pages).
International Search Report and Written Opinion from International Patent Application No. PCT/CN2020/075232 dated Apr. 29, 2020 (10 pages).
International Search Report and Written Opinion from International Patent Application No. PCT/CN2020/075235 dated May 8, 2020 (11 pages).
International Search Report and Written Opinion from International Patent Application No. PCT/CN2020/075238 dated Apr. 26, 2020 (11 pages).
International Search Report and Written Opinion from International Patent Application No. PCT/CN2020/089555 dated Aug. 10, 2020 ( 12 pages).
International Search Report and Written Opinion from International Patent Application No. PCT/CN2020/089556 dated Aug. 11, 2020 ( 10 pages).
International Search Report and Written Opinion from International Patent Application No. PCT/CN2020/120287 dated Dec. 31, 2020 (8 pages).
Non Final Office Action from U.S. Appl. No. 17/324,432 dated Aug. 4, 2021.
Non Final Office Action from U.S. Appl. No. 17/324,482 dated Sep. 1, 2021.
Non Final Office Action from U.S. Appl. No. 17/398,903 dated Jul. 26, 2023.
Non Final Office Action from U.S. Appl. No. 17/519,310 dated Feb. 8, 2022.
Non Final Office Action from U.S. Appl. No. 17/519,310 dated Jun. 1, 2022.
Non Final Office Action from U.S. Appl. No. 17/401,438 dated Sep. 1, 2023.
Final Office Action from U.S. Appl. No. 17/398,903 dated Nov. 2, 2023.
Non Final Office Action from U.S. Appl. No. 17/717,549 dated Aug. 11, 2022.

(56) References Cited

OTHER PUBLICATIONS

Notice of Allowance from U.S. Appl. No. 17/717,549 dated Dec. 28, 2022.
Intemational Search Report and Written Opinion from PCT/CN2020/074152 dated Apr. 20, 2020 (10 pages).
Chinese Notice of Allowance from Chinese Patent Application No. 202080013766.7 dated Jul. 2, 2024, 8 pages.
Extended European Search Report from European Application No. 23210725.0 dated Feb. 6, 2024, 14 pages.
Non Final Office Action from U.S. Appl. No. 17/389,200 dated Aug. 15, 2023.
Non Final Office Action from U.S. Appl. No. 17/398,903 dated Mar. 1, 2024.
Singaporean Office Action from Singapore Application No. 11202112279W dated May 15, 2024, 9 pages.
European Office Action from European Application No. 20805395.9 dated May 28, 2024, 5 pages.
Final Office Action from U.S. Appl. No. 17/389,200 dated Feb. 7, 2024, 46 pages.
JVET-M0059-v1, Zhou, T., et al., "CE4: Non-scaling STMVP (Test 4.2.1)," Joint Video Exploration Team (JVET) of ITU-T SG 16 WP 3 and ISO/IEC JTC 1/SC 29/WG 11 13th Meeting: Marrakesh, MA, Jan. 9-18, 2019, 3 pages.
JVET-M0059-v2, Zhou, T., et al., "CE4: Non-scaling STMVP (Test 4.2.1)," Joint Video Exploration Team (JVET) of ITU-T SG 16 WP 3 and ISO/IEC JTC 1/SC 29/WG 11 13th Meeting: Marrakesh, MA, Jan. 9-18, 2019, 3 pages.
Chinese Notice of Allowance from Chinese Patent Application No. 202080012359.4 dated Dec. 22, 2025, 10 pages.

* cited by examiner

INTERACTION BETWEEN MV PRECISIONS AND MV DIFFERENCE CODING

CROSS REFERENCE TO RELATED APPLICATIONS

This application is a continuation of U.S. patent application Ser. No. 17/389,200 filed on Jul. 29, 2021, which is a continuation of International Application No. PCT/CN2020/074152 filed on Feb. 2, 2020, which claims the priority to and benefits of International Patent Application No. PCT/CN2019/074681 filed on Feb. 3, 2019. For all purposes under the U.S. law, the entire disclosure of the aforementioned applications are incorporated by reference as part of the disclosure of this application.

TECHNICAL FIELD

The present disclosure relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to the interactions between motion vector precisions and motion vector coding are described. The described methods may be applied to both the existing video coding standards (e.g., High Efficiency Video Coding (HEVC)) and future video coding standards or video codecs.

In one representative aspect, the disclosed technology may be used to provide a method for video coding. This method includes determining, based on at least one of motion information, a motion vector difference (MVD) precision or a motion vector (MV) precision of a current video block, between enabling and disabling a symmetric motion vector difference (SMVD) mode for the current video block, and reconstructing, based on the determining, the current video block.

In another representative aspect, the disclosed technology may be used to provide a method for video processing. This method includes determining, for a conversion between a first block of video and a bitstream representation of the first block, whether a symmetric motion vector difference (SMVD) mode for the first block is enabled or disabled and/or how to apply the SMVD mode for the first block, based on at least one of motion information, a motion vector difference (MVD) precision and a motion vector (MV) precision of the first block; and performing the conversion based on the determining.

In another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

DETAILED DESCRIPTION

Figure 1:
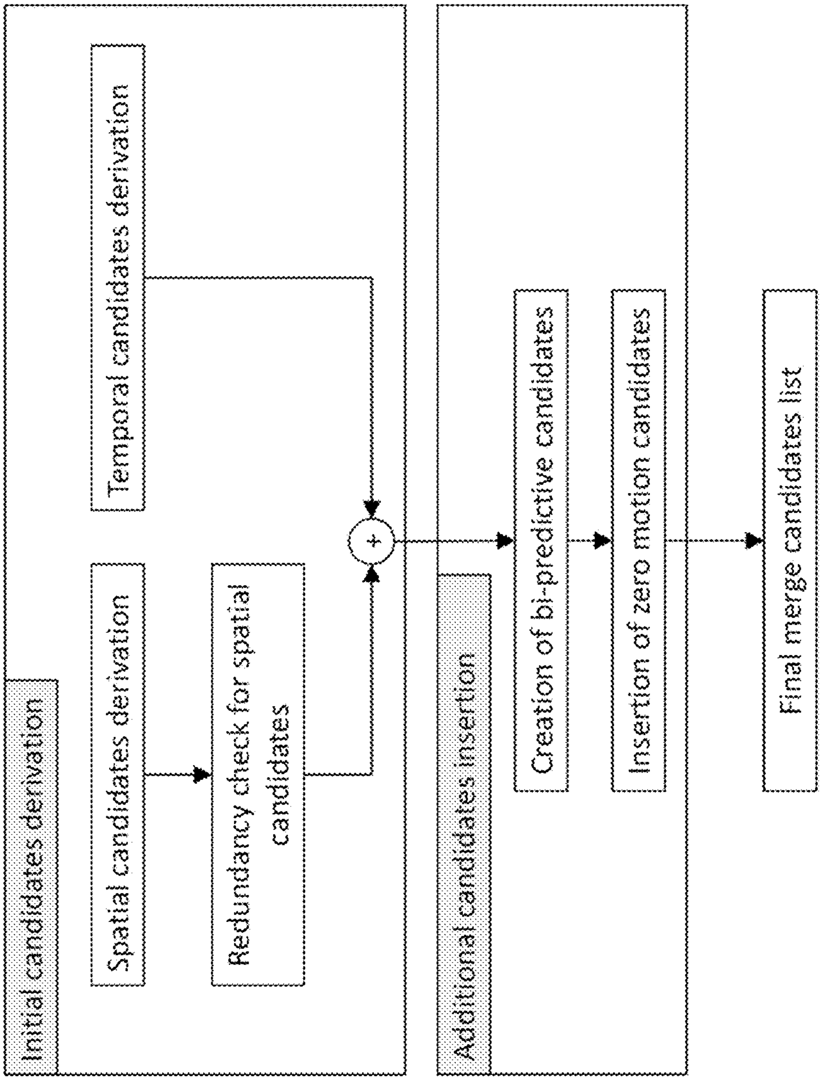
FIG. 1 shows an example of constructing a merge candidate list.

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, case of editing, random access, and end-to-end delay (latency). The compressed format usually conforms to a standard video compression specification, e.g., the High Efficiency Video Coding (HEVC) standard (also known as H.265 or Moving Picture Experts Group (MPEG)-H Part 2), the Versatile Video Coding standard to be finalized, or other current and/or future video coding standards.

Embodiments of the disclosed technology may be applied to existing video coding standards (e.g., HEVC, H.265) and future standards to improve compression performance. Section headings are used in the present disclosure to improve readability of the description and do not in any way limit the discussion or the embodiments (and/or implementations) to the respective sections only.

1. Examples of Inter-Prediction in HEVC/H.265

Video coding standards have significantly improved over the years, and now provide, in part, high coding efficiency and support for higher resolutions. Recent standards such as HEVC and H.265 are based on the hybrid video coding structure wherein temporal prediction plus transform coding are utilized.

1.1 Examples of Prediction Modes

Each inter-predicted prediction unit (PU) has motion parameters for one or two reference picture lists. In some embodiments, motion parameters include a motion vector and a reference picture index. In other embodiments, the usage of one of the two reference picture lists may also be signaled using inter_pred_idc. In yet other embodiments, motion vectors may be explicitly coded as deltas relative to predictors.

When a coding unit (CU) is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector, corresponding reference picture index for each reference picture list and reference picture list usage are signaled explicitly per each PU.

When signaling indicates that one of the two reference picture lists is to be used, the PU is produced from one block of samples. This is referred to as "uni-prediction." Uni-prediction is available both for P-slices and B-slices.

When signaling indicates that both of the reference picture lists are to be used, the PU is produced from two blocks of samples. This is referred to as "bi-prediction." Bi-prediction is available for B-slices only.

1.1.1 Embodiments of Constructing Candidates for Merge Mode

When a PU is predicted using merge mode, an index pointing to an entry in the merge candidates list is parsed from the bitstream and used to retrieve the motion information. The construction of this list can be summarized according to the following sequence of steps:

Step 1: Initial candidates derivation
  Step 1.1: Spatial candidates derivation
  Step 1.2: Redundancy check for spatial candidates
  Step 1.3: Temporal candidates derivation
Step 2: Additional candidates insertion
  Step 2.1: Creation of bi-predictive candidates
  Step 2.2: Insertion of zero motion candidates FIG. 1 shows an example of constructing a merge candidate list based on the sequence of steps summarized above. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates does not reach to maximum number of merge candidate (MaxNumMergeCand) which is signalled in slice header. Since the number of candidates is constant, index of best merge candidate is encoded using truncated unary (TU) binarization. If the size of CU is equal to 8, all the PUs of the current CU share a single merge candidate list, which is identical to the merge candidate list of the 2N×2N prediction unit.

1.1.2 Constructing Spatial Merge Candidates

Figure 2:
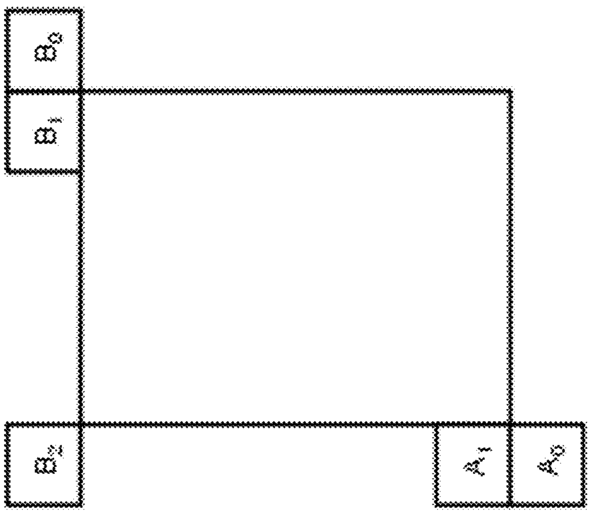
FIG. 2 shows an example of positions of spatial candidates.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g., because it belongs to another slice or tile) or is intra coded. After candidate at position $A_1$ is added, the addition of the remaining candidates is subject to a redundancy check which ensures that candidates with same motion information are excluded from the list so that coding efficiency is improved.

Figure 3:
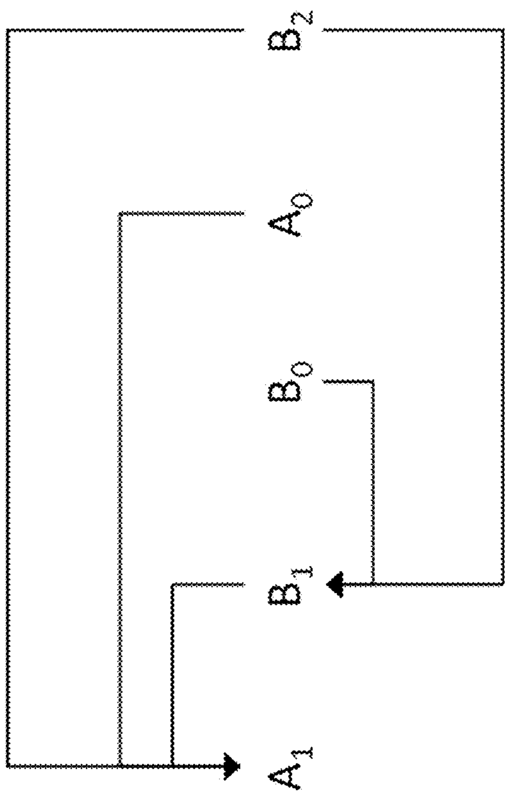
FIG. 3 shows an example of candidate pairs subject to a redundancy check of spatial merge candidates.
Figure 4A:
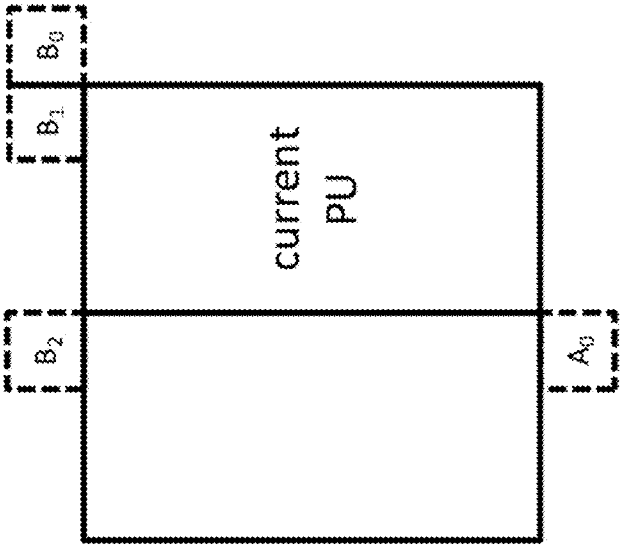
FIGS. 4A and 4B show examples of the position of a second prediction unit (PU) based on the size and shape of the current block.
Figure 4B:
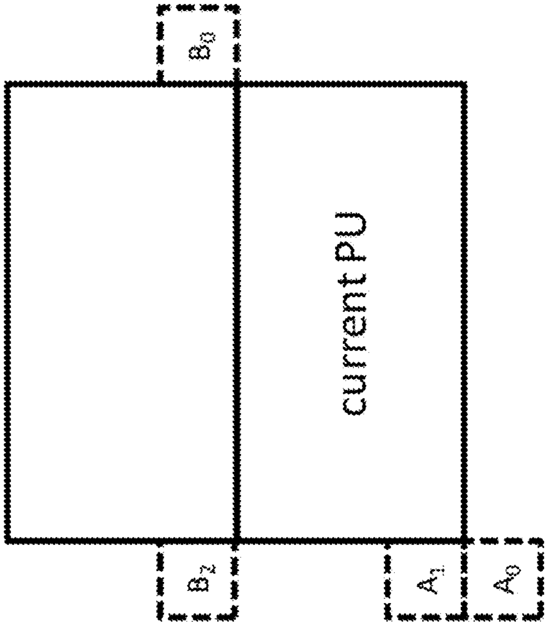

To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIGS. 4A and 4B depict the second PU for the case of N×2N and 2N×N, respectively. When the current PU is partitioned as N×2N, candidate at position Ai is not considered for list construction.

In some embodiments, adding this candidate may lead to two prediction units having the same motion information, which is redundant to just have one PU in a coding unit. Similarly, position $B_1$ is not considered when the current PU is partitioned as 2N×N.

1.1.3 Constructing Temporal Merge Candidates

In this step, only one candidate is added to the list. Particularly, in the derivation of this temporal merge candidate, a scaled motion vector is derived based on co-located PU belonging to the picture which has the smallest picture order count (POC) difference with current picture within the given reference picture list. The reference picture list to be used for derivation of the co-located PU is explicitly signaled in the slice header.

Figure 5:
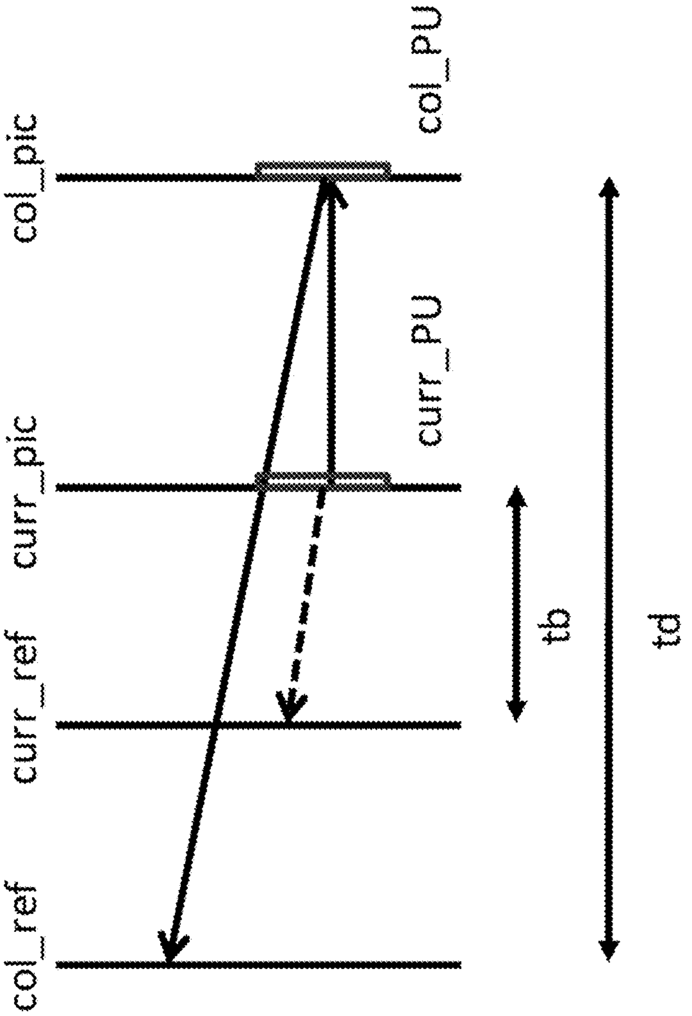
FIG. 5 shows an example of motion vector scaling for temporal merge candidates.

FIG. 5 shows an example of the derivation of the scaled motion vector for a temporal merge candidate (as the dotted line), which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. For a B-slice, two motion vectors, one is for reference picture list 0 and the other is for reference picture list 1, are obtained and combined to make the bi-predictive merge candidate.

Figure 6:
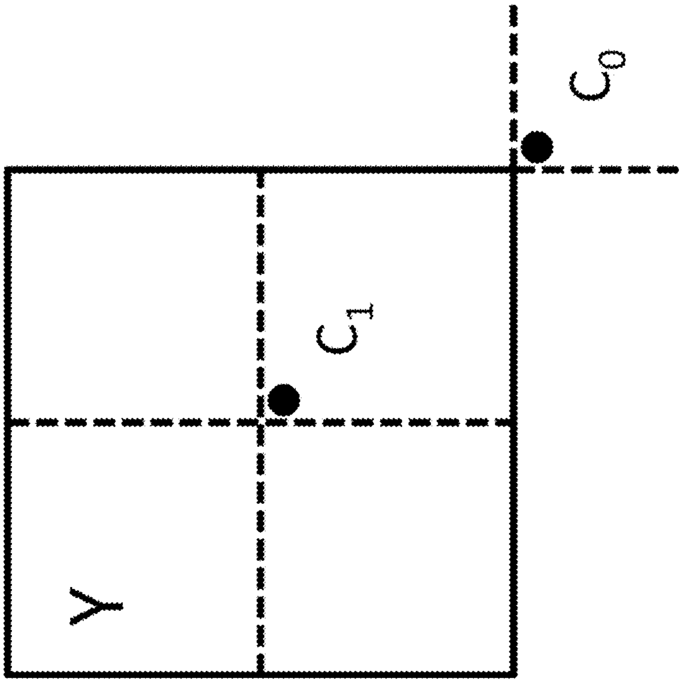
FIG. 6 shows an example of candidate positions for temporal merge candidates.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current coding tree unit (CTU), position $C_1$ is used. Otherwise, position $C_0$ is used in the derivation of the temporal merge candidate.

1.1.4 Constructing Additional Types of Merge Candidates

Besides spatio-temporal merge candidates, there are two additional types of merge candidates: combined bi-predictive merge candidate and zero merge candidate. Combined bi-predictive merge candidates are generated by utilizing spatio-temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate.

Figure 7:
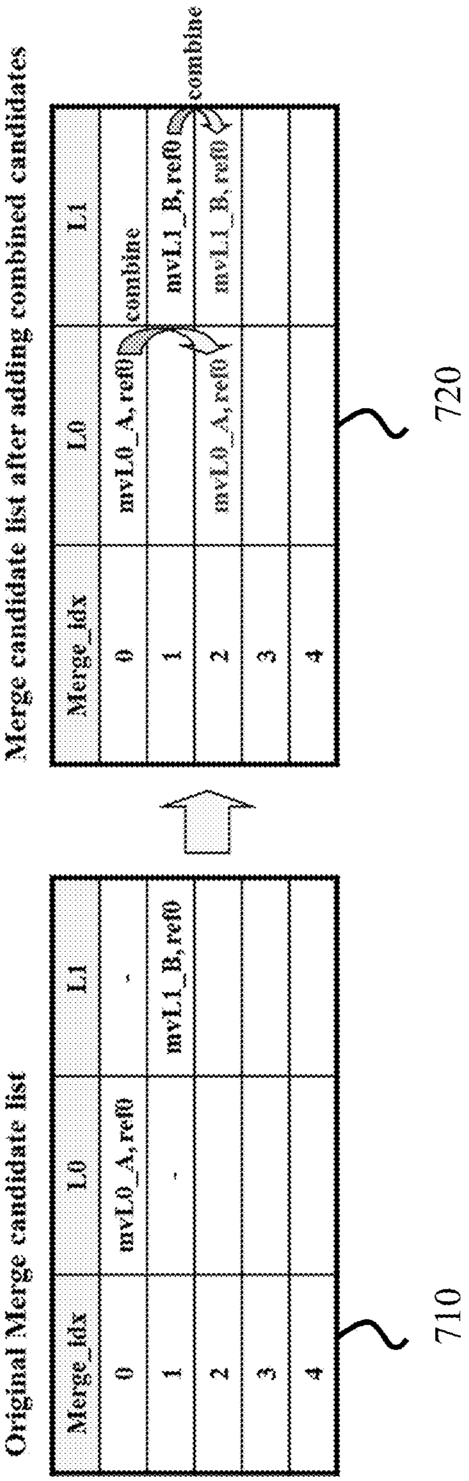
FIG. 7 shows an example of generating a combined bi-predictive merge candidate.

FIG. 7 shows an example of this process, wherein two candidates in the original list (710, on the left), which have mvL0 and refIdxL0 or mvL1 and refIdxL1, are used to create a combined bi-predictive merge candidate added to the final list (720, on the right).

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni- and bi-directional prediction, respectively. In some embodiments, no redundancy check is performed on these candidates.

1.1.5 Examples of Motion Estimation Regions for Parallel Processing

To speed up the encoding process, motion estimation can be performed in parallel whereby the motion vectors for all prediction units inside a given region are derived simultaneously. The derivation of merge candidates from spatial neighborhood may interfere with parallel processing as one prediction unit cannot derive the motion parameters from an adjacent PU until its associated motion estimation is completed. To mitigate the trade-off between coding efficiency and processing latency, a motion estimation region (MER) may be defined. The size of the MER may be signaled in the picture parameter set (PPS) using the "log 2_parallel_merge_level_minus2" syntax element. When a MER is defined, merge candidates falling in the same region are marked as unavailable and therefore not considered in the list construction.

1.2 Embodiments of Advanced Motion Vector Prediction (AMVP)

AMVP exploits spatio-temporal correlation of motion vector with neighboring PUs, which is used for explicit transmission of motion parameters. It constructs a motion vector candidate list by firstly checking availability of left, above temporally neighboring PU positions, removing redundant candidates and adding zero vector to make the candidate list to be constant length. Then, the encoder can select the best predictor from the candidate list and transmit the corresponding index indicating the chosen candidate. Similarly with merge index signaling, the index of the best motion vector candidate is encoded using truncated unary. The maximum value to be encoded in this case is 2 (see FIG. 8). In the following sections, details about derivation process of motion vector prediction candidate are provided.

1.2.1 Examples of Constructing Motion Vector Prediction Candidates

Figure 8:
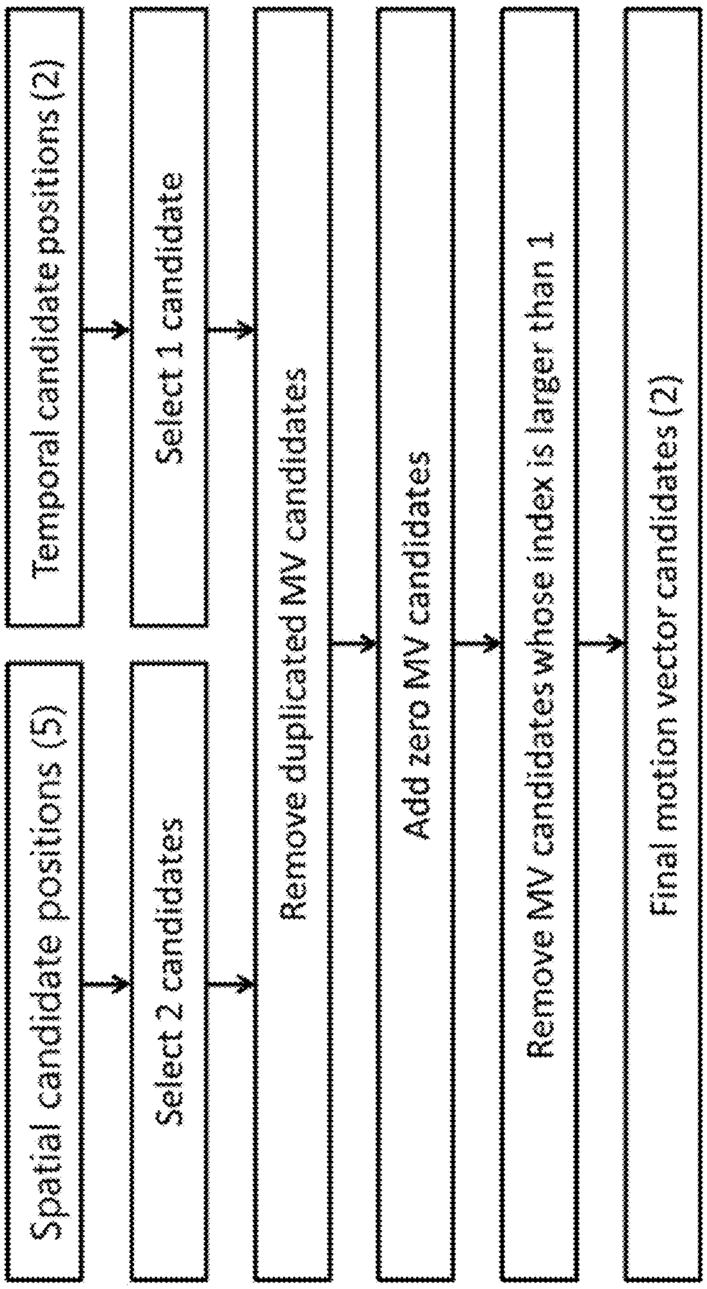
FIG. 8 shows an example of constructing motion vector prediction candidates.

FIG. 8 summarizes derivation process for motion vector prediction candidate, and may be implemented for each reference picture list with refidx as an input.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as previously shown in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

1.2.2 Constructing Spatial Motion Vector Candidates

In the derivation of spatial motion vector candidates, a maximum of two candidates are considered among five potential candidates, which are derived from PUs located in positions as previously shown in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows:

No spatial scaling (1) Same reference picture list, and same reference picture index (same POC)

(2) Different reference picture list, but same reference picture (same POC)

Spatial scaling (3) Same reference picture list, but different reference picture (different POC)

(4) Different reference picture list, and different reference picture (different POC)

The no-spatial-scaling cases are checked first followed by the cases that allow spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
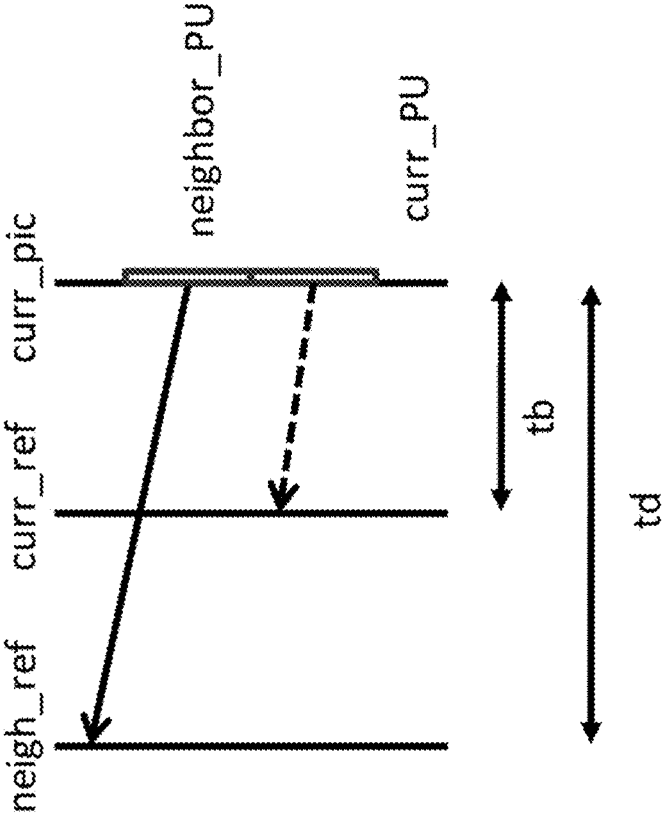
FIG. 9 shows an example of motion vector scaling for spatial motion vector candidates.

As shown in the example in FIG. 9, for the spatial scaling case, the motion vector of the neighbouring PU is scaled in a similar manner as for temporal scaling. One difference is that the reference picture list and index of current PU is given as input; the actual scaling process is the same as that of temporal scaling.

1.2.3 Constructing Temporal Motion Vector Candidates

Apart from the reference picture index derivation, all processes for the derivation of temporal merge candidates are the same as for the derivation of spatial motion vector candidates (as shown in the example in FIG. 6). In some embodiments, the reference picture index is signaled to the decoder.

2. Example of Inter Prediction Methods in Joint Exploration Model (JEM)

In some embodiments, future video coding technologies are explored using a reference software known as the Joint Exploration Model (JEM). In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC), Locally Adaptive Motion Vector Resolution (LAMVR), Overlapped Block Motion Compensation (OBMC), Local Illumination Compensation (LIC), and Decoder-side Motion Vector Refinement (DMVR).

2.1 Examples of Adaptive Motion Vector Difference Resolution

In some embodiments, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM:

- During RD check of a CU with normal quarter luma sample MVD resolution, the motion information of the current CU (integer luma sample accuracy) is stored. The stored motion information (after rounding) is used as the starting point for further small range motion vector refinement during the rate distortion (RD) check for the same CU with integer luma sample and 4 luma sample MVD resolution so that the time-consuming motion estimation process is not duplicated three times.
- RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

2.2 Examples of Higher Motion Vector Storage Accuracy

In HEVC, motion vector accuracy is one-quarter pel (one-quarter luma sample and one-eighth chroma sample for 4:2:0 video). In the JEM, the accuracy for the internal motion vector storage and the merge candidate increases to 1/16 pel. The higher motion vector accuracy (1/16 pel) is used in motion compensation inter prediction for the CU coded with skip/merge mode. For the CU coded with normal AMVP mode, either the integer-pel or quarter-pel motion is used.

Scalable High efficiency Video Coding (SHVC) upsampling interpolation filters, which have same filter length and normalization factor as HEVC motion compensation interpolation filters, are used as motion compensation interpolation filters for the additional fractional pel positions. The chroma component motion vector accuracy is 1/32 sample in the JEM, the additional interpolation filters of 1/32 pel fractional positions are derived by using the average of the filters of the two neighbouring 1/16 pel fractional positions.

2.3 Examples of Affine Motion Compensation Prediction

Figure 10:
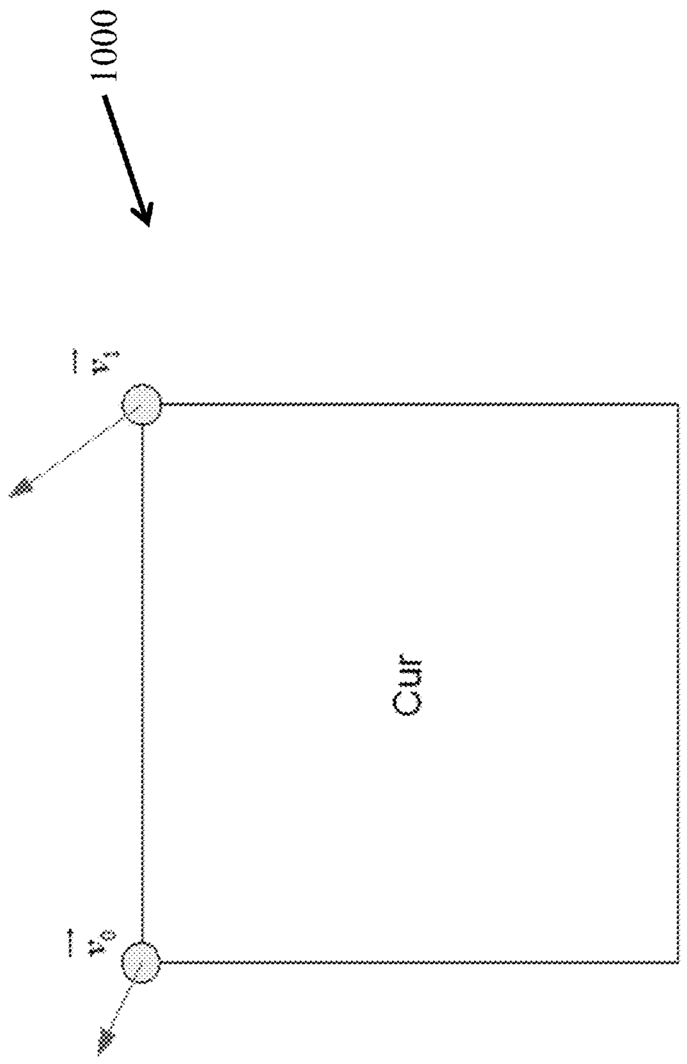
FIG. 10 shows an example of a simplified affine motion model.

In HEVC, only a translation motion model is applied for motion compensation prediction (MCP). However, the camera and objects may have many kinds of motion, e.g., zoom in/out, rotation, perspective motions, and/or other irregular motions. JEM, on the other hand, applies a simplified affine transform motion compensation prediction. FIG. 10 shows an example of an affine motion field of a block 1000 described by two control point motion vectors $v_0$ and $v_1$. The motion vector field (MVF) of the block 1000 can be described by the following equation:

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases} \quad \text{Eq. (1)}$$

As shown in FIG. 10, $(v_{0x}, v_{0y})$ is motion vector of the top-left corner control point, and $(v_{1x}, v_{1y})$ is motion vector of the top-right corner control point. To simplify the motion compensation prediction, sub-block based affine transform prediction can be applied. The sub-block size M×N is derived as follows:

$$\begin{cases} M = clip3\left(4, w, \dfrac{w \times MvPre}{\max(\text{abs}(v_{1x} - v_{0x}), abs(v_{1y} - v_{0y}))}\right) \\ N = clip3\left(4, h, \dfrac{h \times MvPre}{\max(\text{abs}(v_{2x} - v_{0x}), abs(v_{2y} - v_{0y}))}\right) \end{cases} \quad \text{Eq. (2)}$$

Here, MvPre is the motion vector fraction accuracy (e.g., 1/16 in JEM). $(v_{2x}, v_{2y})$ is motion vector of the bottom-left control point, calculated according to Eq. (1). M and N can be adjusted downward if necessary to make it a divisor of w and h, respectively.

Figure 11:
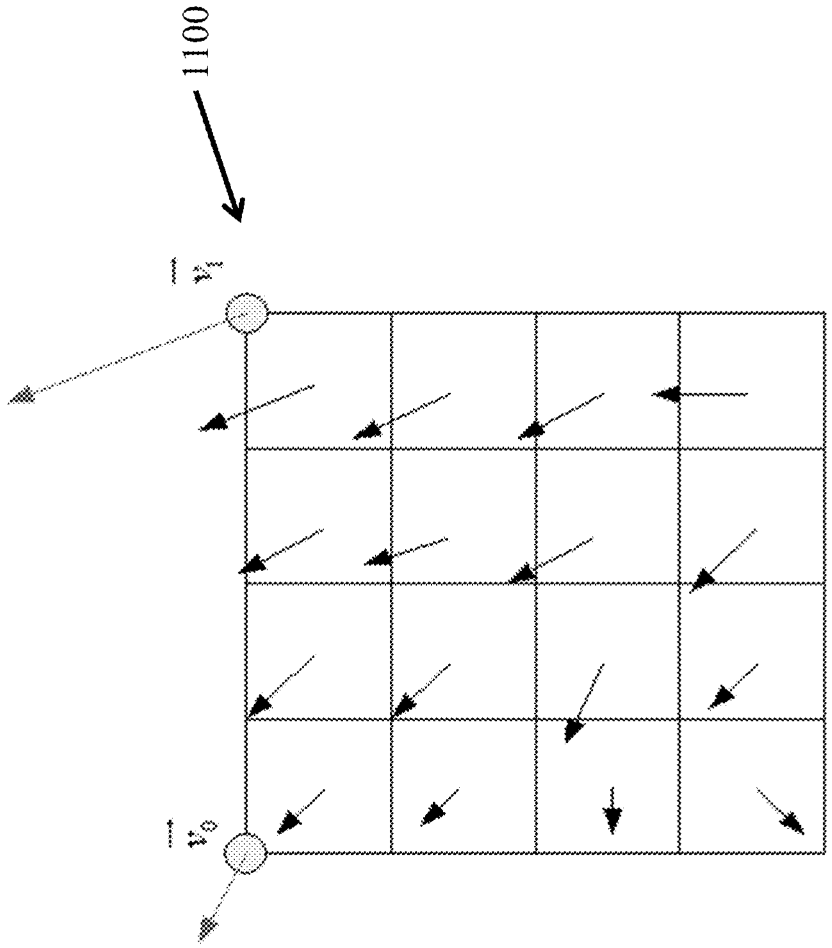
FIG. 11 shows an example of an affine motion vector field (MVF) per sub-block.

FIG. 11 shows an example of affine MVF per sub-block for a block 1100. To derive motion vector of each M×N sub-block, the motion vector of the center sample of each sub-block can be calculated according to Eq. (1), and rounded to the motion vector fraction accuracy (e.g., 1/16 in JEM). Then the motion compensation interpolation filters can be applied to generate the prediction of each sub-block with derived motion vector. After the MCP, the high accuracy motion vector of each sub-block is rounded and saved as the same accuracy as the normal motion vector.

2.3.1 Embodiments of the AF_INTER Mode

In the JEM, there are two affine motion modes: AF_INTER mode and AF_MERGE mode. For CUs with both width and height larger than 8, AF_INTER mode can be applied. An affine flag in CU level is signaled in the bitstream to indicate whether AF_INTER mode is used. In the AF_INTER mode, a candidate list with motion vector pair $\{(v_0, v_1)|v_0=\{v_A, v_B, v_C\}, v_1=\{v_D, v_E\}\}$ is constructed using the neighboring blocks.

Figure 12:
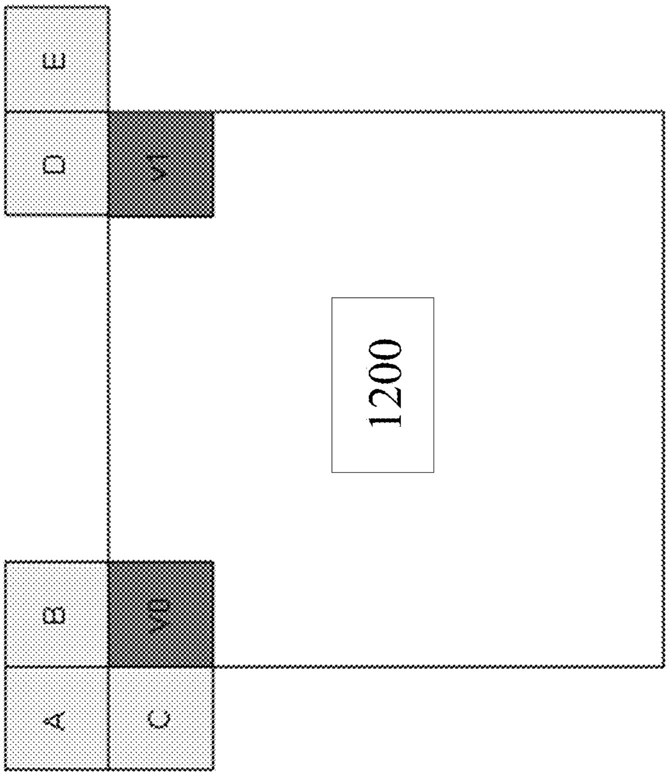
FIG. 12 shows an example of motion vector prediction (MVP) for the AF_INTER affine motion mode.

FIG. 12 shows an example of motion vector prediction (MVP) for a block 1200 in the AF_INTER mode. As shown in FIG. 12, $v_0$ is selected from the motion vectors of the sub-block A, B, or C. The motion vectors from the neighboring blocks can be scaled according to the reference list. The motion vectors can also be scaled according to the relationship among the Picture Order Count (POC) of the reference for the neighboring block, the POC of the reference for the current CU, and the POC of the current CU. The approach to select $v_1$ from the neighboring sub-block D and E is similar. If the number of candidate list is smaller than 2, the list is padded by the motion vector pair composed by duplicating each of the AMVP candidates. When the candidate list is larger than 2, the candidates can be firstly sorted according to the neighboring motion vectors (e.g., based on the similarity of the two motion vectors in a pair candidate). In some implementations, the first two candidates are kept. In some embodiments, a Rate Distortion (RD) cost check is used to determine which motion vector pair candidate is selected as the control point motion vector prediction (CPMVP) of the current CU. An index indicating the position of the CPMVP in the candidate list can be signaled in the bitstream. After the CPMVP of the current affine CU is determined, affine motion estimation is applied and the control point motion vector (CPMV) is found. Then the difference of the CPMV and the CPMVP is signaled in the bitstream.

Figure 13B:
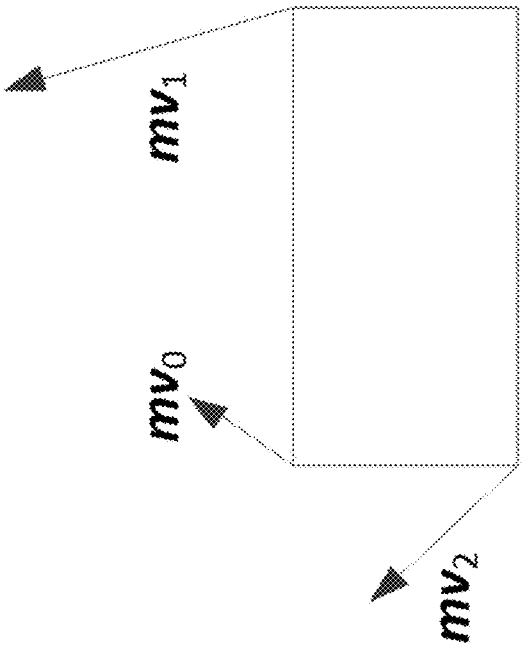
FIGS. 13A and 13B show examples of the 4-parameter and 6-parameter affine models, respectively.
Figure 13A:
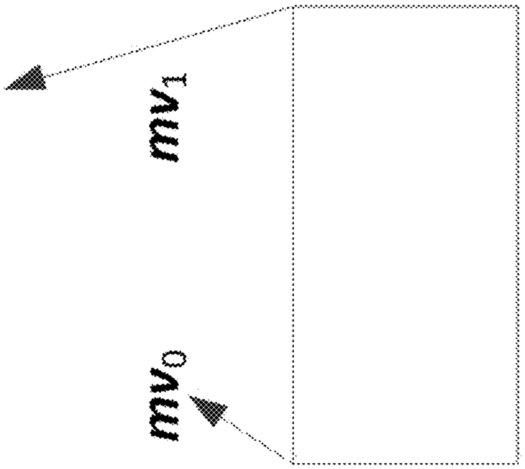

In AF_INTER mode, when 4/6 parameter affine mode is used, 2/3 control points are required, and therefore 2/3 MVD needs to be coded for these control points, as shown in FIGS. 13A and 13B. In an existing implementation, the MV may be derived as follows, e.g., it predicts $mvd_1$ and $mvd_2$ from $mvd_0$.

$$mv_0 = \overline{mv}_0 + mvd_0$$

$$mv_1 = \overline{mv}_1 + mvd_1 + mvd_0$$

$$mv_2 = \overline{mv}_2 + mvd_2 + mvd_0$$

Herein, $\overline{mv}_i$, $mvd_i$ and $mv_1$ are the predicted motion vector, motion vector difference and motion vector of the top-left pixel (i=0), top-right pixel (i=1) or left-bottom pixel (i=2) respectively, as shown in FIG. 13B. In some embodiments, the addition of two motion vectors (e.g., mvA(xA, yA) and mvB(xB, yB)) is equal to summation of two components separately. For example, newMV=mvA+mvB implies that the two components of newMV are set to (xA+xB) and (yA+yB), respectively.

2.3.3 Embodiments of the AF_MERGE Mode

Figure 14B:
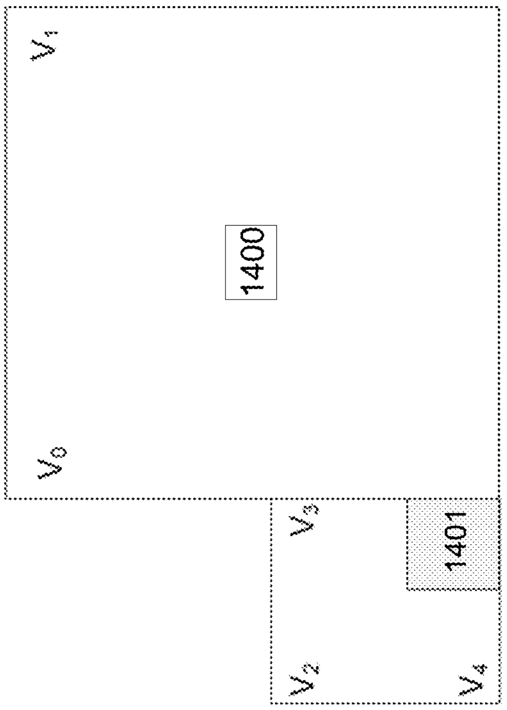
FIGS. 14A and 14B show example candidates for the AF_MERGE affine motion mode.
Figure 14A:
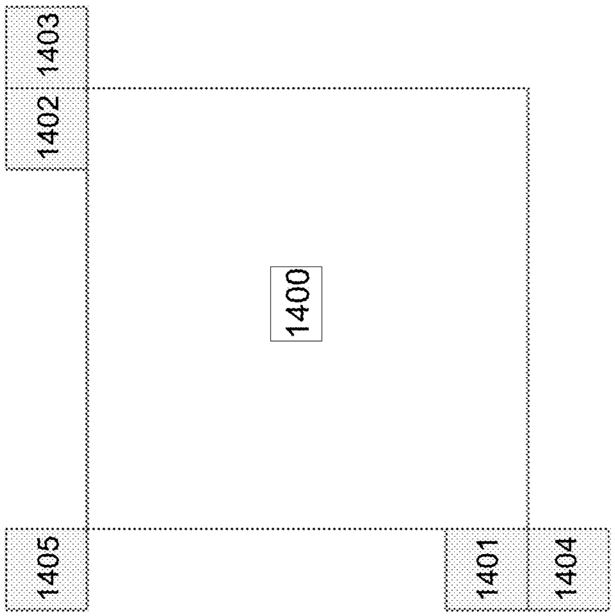

When a CU is applied in AF_MERGE mode, it gets the first block coded with an affine mode from the valid neighboring reconstructed blocks. FIG. 14A shows an example of the selection order of candidate blocks for a current CU 1400. As shown in FIG. 14A, the selection order can be from left (1401), above (1402), above right (1403), left bottom (1404) to above left (1405) of the current CU 1400. FIG. 14B shows another example of candidate blocks for a current CU 1400 in the AF_MERGE mode. If the neighboring left bottom block 1401 is coded in affine mode, as shown in FIG. 14B, the motion vectors $v_2$, $v_3$ and $v_4$ of the top left corner, above right corner, and left bottom corner of the CU containing the sub-block 1401 are derived. The motion vector $v_0$ of the top left corner on the current CU 1400 is calculated based on v2, v3 and v4. The motion vector v1 of the above right of the current CU can be calculated accordingly.

After the CPMV of the current CU v0 and v1 are computed according to the affine motion model in Eq. (1), the MVF of the current CU can be generated. In order to identify whether the current CU is coded with AF_MERGE mode, an affine flag can be signaled in the bitstream when there is at least one neighboring block is coded in affine mode.

2.4 Examples of Bi-Directional Optical Flow (BIO)

The bi-directional optical flow (BIO) method is a sample-wise motion refinement performed on top of block-wise motion compensation for bi-prediction. In some implementations, the sample-level motion refinement does not use signaling.

Let $I^{(k)}$ be the luma value from reference k (k=0, 1) after block motion compensation, and denote $\partial I^{(k)}/\partial x$ and $\partial I^{(k)}/\partial y$ as the horizontal and vertical components of the $I^{(k)}$ gradient, respectively. Assuming the optical flow is valid, the motion vector field $(v_x, v_y)$ is given by:

$$\partial I^{(k)}/\partial t + v_x \partial I^{(k)}/\partial x + v_y \partial I^{(k)}/\partial y = 0. \quad \text{Eq. (5)}$$

Combining this optical flow equation with Hermite interpolation for the motion trajectory of each sample results in a unique third-order polynomial that matches both the function values $I^{(k)}$ and derivatives $\partial I^{(k)}/\partial x$ and $\partial I^{(k)}/\partial y$ at the ends. The value of this polynomial at t=0 is the BIO prediction:

$$pred_{BIO} = 1/2\cdot\left(I^{(0)} + I^{(1)} + v_x/2\cdot\left(\tau_1 \partial I^{(1)}/\partial x - \tau_0 \partial I^{(0)}/\partial x\right) + v_y/2\cdot\left(\tau_1 \partial I^{(1)}/\partial y - \tau_0 \partial I^{(0)}/\partial y\right)\right). \quad \text{Eq. (6)}$$

Figure 15:
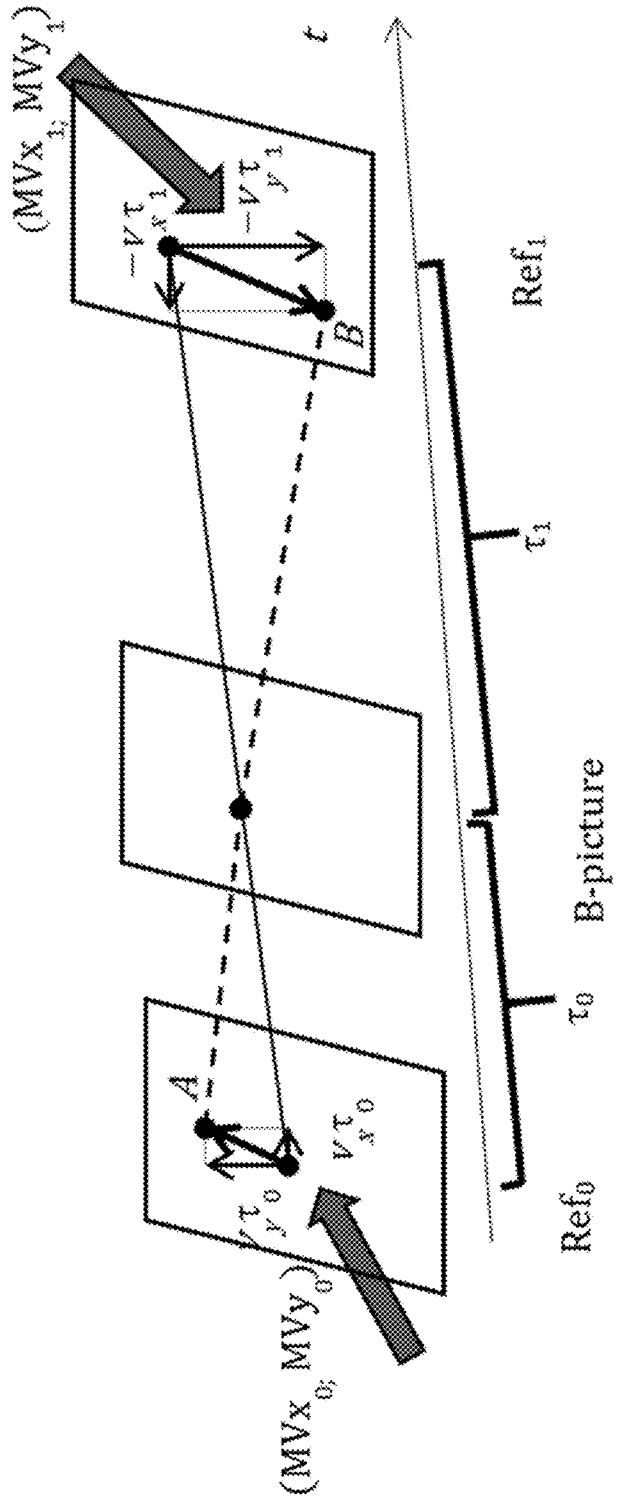
FIG. 15 shows an example of an optical flow trajectory used by the bi-directional optical flow (BIO) algorithm.

FIG. 15 shows an example optical flow trajectory in the Bi-directional Optical flow (BIO) method. Here, $\tau_0$ and $\tau_1$ denote the distances to the reference frames. Distances $\tau_0$ and $\tau_1$ are calculated based on POC for $Ref_0$ and $Ref_1$: $\tau_0$=POC(current)−POC($Ref_0$), $\tau_1$=POC($Ref_1$)−POC(current). If both predictions come from the same time direction (either both from the past or both from the future) then the signs are different (e.g., $\tau_0\cdot\tau_1<0$). In this case, BIO is applied if the prediction is not from the same time moment (e.g., $\tau_0 \neq \tau_1$). Both referenced regions have non-zero motion (e.g., $MVx_0$, $MVy_0$, $MVx_1$, $MVy_1$, $\neq 0$) and the block motion vectors are proportional to the time distance (e.g., $MVx_0/MVx_1 = MVy_0/MVy_1 = -\tau_0/\tau_1$).

The motion vector field $(v_x, v_y)$ is determined by minimizing the difference Δ between values in points A and B. FIG. 9 shows an example of intersection of motion trajectory and reference frame planes. Model uses only first linear term of a local Taylor expansion for Δ:

$$\Delta = \left(I^{(0)} - I^{(1)}{}_0 + v_x\left(\tau_1 \partial I^{(1)}/\partial x + \tau_0 \partial I^{(0)}/\partial x\right) + v_y\left(\tau_1 \partial I^{(1)}/\partial y + \tau_0 \partial I^{(0)}/\partial y\right)\right) \quad \text{Eq. (7)}$$

All values in the above equation depend on the sample location, denoted as (i', j'). Assuming the motion is consistent in the local surrounding area, Δ can be minimized inside the (2M+1)×(2M+1) square window Ω centered on the currently predicted point (i, j), where M is equal to 2:

$$(v_x, v_y) = \arg\min_{v_x, v_y} \sum_{[i',j] \in \Omega} \Delta^2[i', j'] \qquad \text{Eq. (8)}$$

For this optimization problem, the JEM uses a simplified approach making first a minimization in the vertical direction and then in the horizontal direction. This results in the following:

$$v_x = (s_1 + r) > m?\ clip3\left(-thBIO, thBIO, -\frac{s_3}{(s_1 + r)}\right) : 0 \qquad \text{Eq. (9)}$$

$$v_y = (s_5 + r) > m?\ clip3\left(-thBIO, thBIO, -\frac{s_6 - v_x s_2/2}{(s_5 + r)}\right) : 0 \qquad \text{Eq. (10)}$$

where, $$s_1 = \sum_{[i',j] \in \Omega} (\tau_1 \partial I^{(1)}/\partial x + \tau_0 \partial I^{(0)}/\partial x)^2; \qquad \text{Eq. (11)}$$

$$s_3 = \sum_{[i',j] \in \Omega} (I^{(1)} - I^{(0)})(\tau_1 \partial I^{(1)}/\partial x + \tau_0 \partial I^{(0)}/\partial x);$$

$$s_2 = \sum_{[i',j] \in \Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_5 = \sum_{[i',j] \in \Omega} (\tau_1 \partial I^{(1)}/\partial y + \tau_0 \partial I^{(0)}/\partial y)^2;$$

$$s_6 = \sum_{[i',j] \in \Omega} (I^{(1)} - I^{(0)})(\tau_1 \partial I^{(1)}/\partial y + \tau_0 \partial I^{(0)}/\partial y)$$

In order to avoid division by zero or a very small value, regularization parameters r and m can be introduced in Eq. (9) and Eq. (10), where:

$$r = 500 \cdot 4^{d-8} \qquad \text{Eq. (12)}$$

$$m = 700 \cdot 4^{d-8} \qquad \text{Eq. (13)}$$

Here, d is bit depth of the video samples.

Figure 16B:
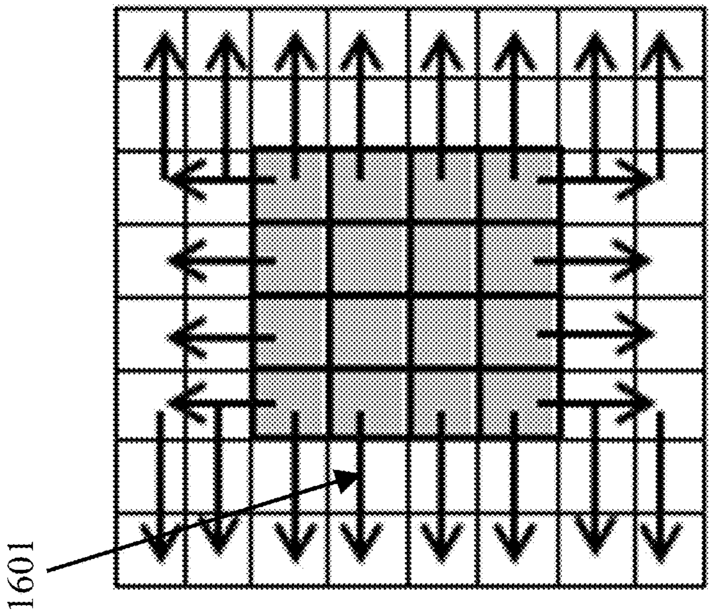
FIGS. 16A and 16B show example snapshots of using of the bi-directional optical flow (BIO) algorithm without block extensions.
Figure 16A:
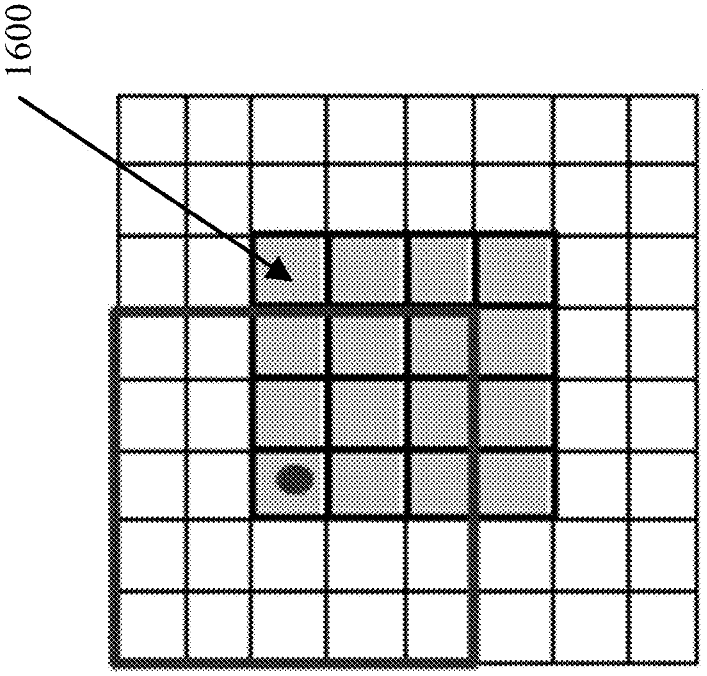

In order to keep the memory access for BIO the same as for regular bi-predictive motion compensation, all prediction and gradients values, $I^{(k)}$, $\partial I^{(k)}/\partial x$, $\partial I^{(k)}/\partial y$, are calculated for positions inside the current block. FIG. 16A shows an example of access positions outside of a block 1600. As shown in FIG. 16A, in Eq. (9), (2M+1)×(2M+1) square window Ω centered in currently predicted point on a boundary of predicted block needs to accesses positions outside of the block. In the JEM, values of $I^{(k)}$, $\partial I^{(k)}/\partial x$, $\partial I^{(k)}/\partial y$ outside of the block are set to be equal to the nearest available value inside the block. For example, this can be implemented as a padding area 1601, as shown in FIG. 16B.

With BIO, it is possible that the motion field can be refined for each sample. To reduce the computational complexity, a block-based design of BIO is used in the JEM. The motion refinement can be calculated based on a 4×4 block. In the block-based BIO, the values of $s_n$ in Eq. (9) of all samples in a 4×4 block can be aggregated, and then the aggregated values of $s_n$ in are used to derived BIO motion vectors offset for the 4×4 block. More specifically, the following formula can used for block-based BIO derivation:

$$s_{1,b_k} = \sum_{(x,y) \in b_k} \sum_{[i',j] \in \Omega(x,y)} (\tau_1 \partial I^{(1)}/\partial_x + \tau_0 \partial I^{(0)}/\partial_x)^2; \qquad \text{Eq. (14)}$$

$$s_{3,b_k} = \sum_{(x,y) \in b_k} \sum_{[i',j] \in \Omega(x,y)} (I^{(1)} - I^{(0)})(\tau_1 \partial I^{(1)}/\partial x + \tau_0 \partial I^{(0)}/\partial x);$$

$$s_{2,b_k} = \sum_{(x,y) \in b_k} \sum_{[i',j] \in \Omega} (\tau_1 \partial I^{(1)}/\partial_x + \tau_0 \partial I^{(0)}/\partial_x)(\tau_1 \partial I^{(1)}/\partial y + \tau_0 \partial I^{(0)}/\partial_y);$$

$$s_{5,b_k} = \sum_{(x,y) \in b_k} \sum_{[i',j] \in \Omega} (\tau_1 \partial I^{(1)}/\partial_y + \tau_0 \partial I^{(0)}/\partial_y)^2;$$

$$s_{6,b_k} = \sum_{(x,y) \in b_k} \sum_{[i',j] \in \Omega} (I^{(1)} - I^{(0)})(\tau_1 \partial I^{(1)}/\partial y + \tau_0 \partial I^{(0)}/\partial_y)$$

Here, $b_k$ denotes the set of samples belonging to the k-th 4×4 block of the predicted block. $s_n$ in Eq (9) and Eq (10) are replaced by $((s_n, b_k) >> 4)$ to derive the associated motion vector offsets.

In some scenarios, MV regiment of BIO may be unreliable due to noise or irregular motion. Therefore, in BIO, the magnitude of MV regiment is clipped to a threshold value. The threshold value is determined based on whether the reference pictures of the current picture are all from one direction. For example, if all the reference pictures of the current picture are from one direction, the value of the threshold is set to $12 \times 2^{14-d}$; otherwise, it is set to $12 \times 2^{13-d}$.

Gradients for BIO can be calculated at the same time with motion compensation interpolation using operations consistent with HEVC motion compensation process (e.g., two dimensional (2D) separable Finite Impulse Response (FIR)). In some embodiments, the input for the 2D separable FIR is the same reference frame sample as for motion compensation process and fractional position (fracX, fracY) according to the fractional part of block motion vector. For horizontal gradient ∂I/∂x, a signal is first interpolated vertically using BIOfilterS corresponding to the fractional position fracY with de-scaling shift d-8. Gradient filter BIOfilterG is then applied in horizontal direction corresponding to the fractional position fracX with de-scaling shift by 18-d. For vertical gradient ∂I/∂y, a gradient filter is applied vertically using BIOfilterG corresponding to the fractional position fracY with de-scaling shift d-8. The signal displacement is then performed using BIOfilterS in horizontal direction corresponding to the fractional position fracX with de-scaling shift by 18-d. The length of interpolation filter for gradients calculation BIOfilterG and signal displacement BIOfilterF can be shorter (e.g., 6-tap) in order to maintain reasonable complexity. Table 1 shows example filters that can be used for gradients calculation of different fractional positions of block motion vector in BIO. Table 2 shows example interpolation filters that can be used for prediction signal generation in BIO.

TABLE 1

Exemplary filters for gradient calculations in BIO

| Fractional pel position | Interpolation filter for gradient(BIOfilterG) |
|---|---|
| 0 | {8, −39, −3, 46, −17, 5} |
| 1/16 | {8, −32, −13, 50, −18, 5} |
| 1/8 | {7, −27, −20, 54, −19, 5} |
| 3/16 | {6, −21, −29, 57, −18, 5} |
| 1/4 | {4, −17, −36, 60, −15, 4} |
| 5/16 | {3, −9, −44, 61, −15, 4} |

TABLE 1-continued

| Exemplary filters for gradient calculations in BIO | |
|---|---|
| Fractional pel position | Interpolation filter for gradient(BIOfilterG) |
| 3/8 | {1, −4, −48, 61, −13, 3} |
| 7/16 | {0, 1, −54, 60, −9, 2} |
| 1/2 | {−1, 4, −57, 57, −4, 1} |

TABLE 2

| Exemplary interpolation filters for prediction signal generation in BIO | |
|---|---|
| Fractional pel position | Interpolation filter for prediction signal(BIOfilterS) |
| 0 | {0, 0, 64, 0, 0, 0} |
| 1/16 | {1, −3, 64, 4, −2, 0} |
| 1/8 | {1, −6, 62, 9, −3, 1} |
| 3/16 | {2, −8, 60, 14, −5, 1} |
| 1/4 | {2, −9, 57, 19, −7, 2} |
| 5/16 | {3, −10, 53, 24, −8, 2} |
| 3/8 | {3, −11, 50, 29, −9, 2} |
| 7/16 | {3, −11, 44, 35, −10, 3} |
| 1/2 | {3, −10, 35, 44, −11, 3} |

In the JEM, BIO can be applied to all bi-predicted blocks when the two predictions are from different reference pictures. When Local Illumination Compensation (LIC) is enabled for a CU, BIO can be disabled.

In some embodiments, OBMC is applied for a block after normal motion compensation (MC) process. To reduce the computational complexity, BIO may not be applied during the OBMC process. This means that BIO is applied in the MC process for a block when using its own MV and is not applied in the MC process when the MV of a neighboring block is used during the OBMC process.

2.5 Examples of Decoder-Side Motion Vector Refinement (DMVR)

In a bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined by a bilateral template matching process. The bilateral template matching applied in the decoder to perform a distortion-based search between a bilateral template and the reconstruction samples in the reference pictures in order to obtain a refined MV without transmission of additional motion information.

Figure 17:
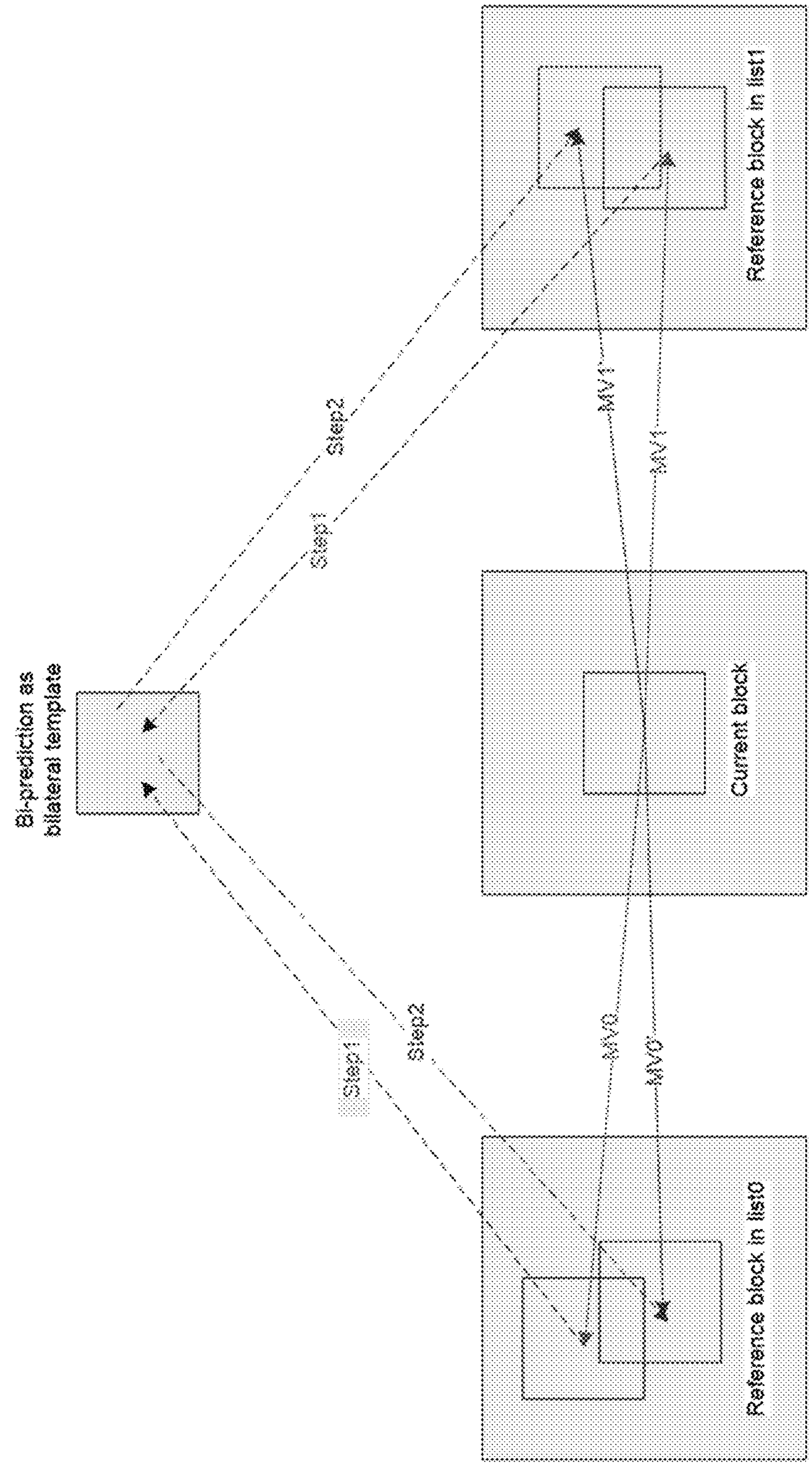
FIG. 17 shows an example of the decoder-side motion vector refinement (DMVR) algorithm based on bilateral template matching.
Figure 18:
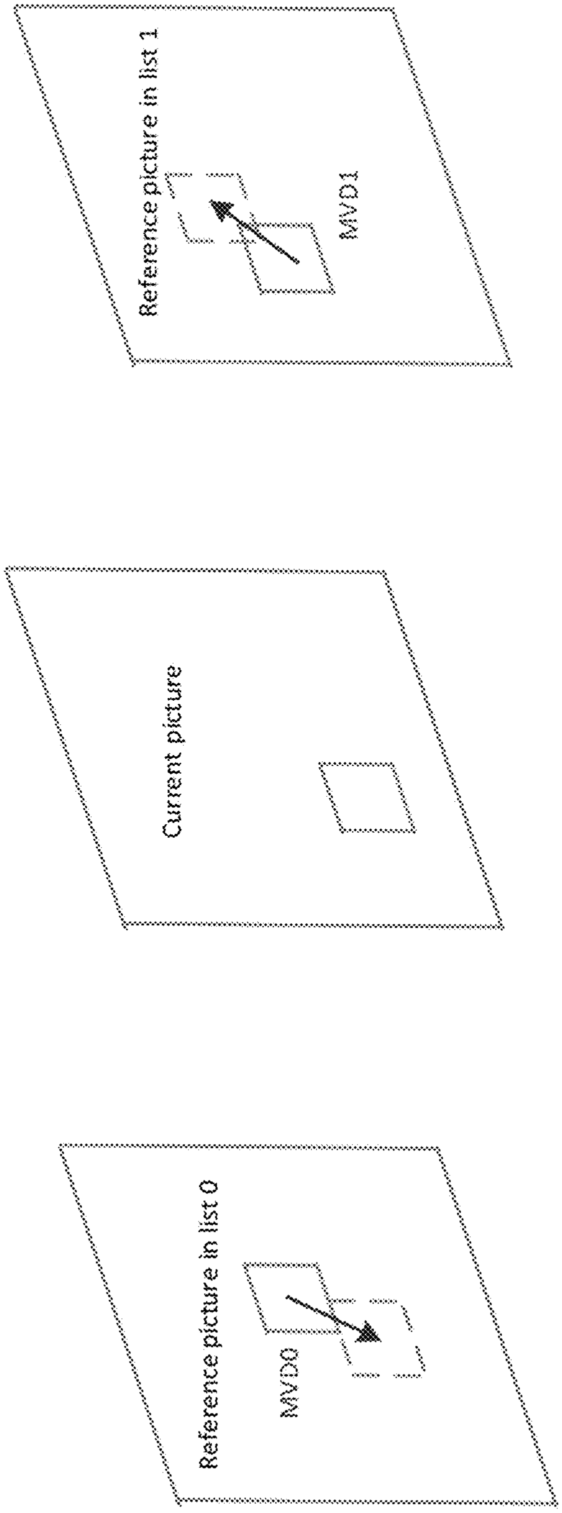
FIG. 18 shows an example of the symmetrical mode.

In DMVR, a bilateral template is generated as the weighted combination (i.e. average) of the two prediction blocks, from the initial MV0 of list0 and MV1 of list1, respectively, as shown in FIG. 17. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 17, are used for generating the final bi-prediction results. A sum of absolute differences (SAD) is used as the cost measure.

DMVR is applied for the merge mode of bi-prediction with one MV from a reference picture in the past and another from a reference picture in the future, without the transmission of additional syntax elements. In the JEM, when LIC, affine motion, FRUC, or sub-CU merge candidate is enabled for a CU, DMVR is not applied.

2.6 Examples of Symmetric Motion Vector Difference (SMVD) Mode

Symmetric motion vector difference (SMVD) is proposed to encode the MVD more efficiently. Firstly, in slice level, variables BiDirPredFlag, RefIdxSymL0 and RefIdxSymL1 are derived as follows:

- The forward reference picture in reference picture list 0 which is nearest to the current picture is searched. If found, RefIdxSymL0 is set equal to the reference index of the forward picture.
- The backward reference picture in reference picture list 1 which is nearest to the current picture is searched. If found, RefIdxSymL1 is set equal to the reference index of the backward picture.
- If both forward and backward picture are found, BiDirPredFlag is set equal to 1.
- Otherwise, following applies:
  - The backward reference picture in reference picture list 0 which is nearest to the current one is searched. If found, RefIdxSymL0 is set equal to the reference index of the backward picture.
  - The forward reference picture in reference picture list 1 which is nearest to the current one is searched. If found, RefIdxSymL1 is set equal to the reference index of the forward picture.
  - If both backward and forward picture are found, BiDirPredFlag is set equal to 1. Otherwise, BiDirPredFlag is set equal to 0.

Secondly, in CU level, a symmetrical mode flag indicating whether symmetrical mode is used or not is explicitly signaled if the prediction direction for the CU is bi-prediction and BiDirPredFlag is equal to 1.

When the flag is true, only mvp_l0_flag, mvp_l1_flag and MVD0 are explicitly signaled. The reference indices are set equal to RefIdxSymL0, RefIdxSymL1 for list 0 and list 1, respectively. MVD1 is just set equal to −MVD0. The final motion vectors are shown in the formulas below:

$$\begin{cases} (mvx_0, mvy_0) = (mvpx_0 + mvdx_0, mvpy_0 + mvdy_0) \\ (mvx_1, mvy_1) = (mvpx_1 - mvdx_0, mvpy_1 - mvdy_0) \end{cases}$$

The modifications in coding unit syntax are shown in Table 3.

TABLE 3

Modifications in coding unit syntax

```
                                                                          Descriptor
coding_unit( x0, y0, cbWidth, cbHeight, treeType ) {
...
    if( slice_type = = B )
        inter_pred_idc[ x0 ][ y0 ]                                        ae(v)
    if( sps_affine_enabled_flag && cbWidth >= 16 && cbHeight >= 16 ) {
        inter_affine_flag[ x0 ][ y0 ]                                     ae(v)
        if( sps_affine_type_flag && inter_affine_flag[ x0 ][ y0 ] )
            cu_affine_type_flag[ x0 ][ y0 ]                               ae(v)
    }
    if( inter_pred_idc[ x0 ][ y0 ] == PRED_BI &&
        BiDirPredFlag && inter_affine_flag[ x0 ][ y0 ] == 0 )
        symmetric_mvd_flag[ x0 ][ y0 ]                                    ae(v)
    if( inter_pred_idc[ x0 ][ y0 ] != PRED_L1 ) {
        if( num_ref_idx_l0_active_minus1 > 0 && !symmetric_mvd_flag[ x0 ][ y0 ] )
            ref_idx_l0[ x0 ][ y0 ]                                        ae(v)
        mvd_coding( x0, y0, 0, 0 )
        if( MotionModelIdc[ x0 ][ y0 ] > 0 )
            mvd_coding( x0, y0, 0, 1 )
        if(MotionModelIdc[ x0 ][ y0 ] > 1 )
            mvd_coding( x0, y0, 0, 2 )
        mvp_l0_flag[ x0 ][ y0 ]                                           ae(v)
    } else {
        MvdL0[ x0 ][ y0 ][ 0 ] = 0
        MvdL0[ x0 ][ y0 ][ 1 ] = 0
    }
    if( inter_pred_idc[ x0 ][ y0 ] != PRED_L0 ) {
        if( num_ref_idx_l1_active_minus1 > 0 && !symmetric_mvd_flag[ x0 ][ y0 ] )
            ref_idx_l1[ x0 ][ y0 ]                                        ae(v)
        if( mvd_l1_zero_flag && inter_pred_idc[ x0 ][ y0 ] = = PRED_BI ) {
            ...
        } else {
            if( !symmetric_mvd_flag[ x0 ][ y0 ] ) {
                mvd_coding( x0, y0, 1, 0 )
            if( MotionModelIdc[ x0 ][ y0 ] > 0 )
                mvd_coding( x0, y0, 1, 1)
            if(MotionModelIdc[ x0 ][ y0 ] > 1 )
                mvd_coding( x0, y0, 1, 2 )
        }
        mvp_l1_flag[ x0 ][ y0 ]                                           ae(v)
    } else {
        MvdL1[ x0 ][ y0 ][ 0 ] = 0
        MvdL1[ x0 ][ y0 ][ 1 ] = 0
    }
    ...
  }
 }
 ...
}
```

7.3.4.9 Motion Vector Difference Syntax

```
                                                          Descriptor
  mvd_coding( x0, y0, refList ,cpIdx ) {
    abs_mvd_greater0_flag[ 0 ]                            ae(v)
    abs_mvd_greater0_flag[ 1 ]                            ae(v)
    if( abs_mvd_greater0_flag[ 0 ] )
        abs_mvd_greater1_flag[ 0 ]                        ae(v)
    if( abs_mvd_greater0_flag[ 1 ] )
        abs_mvd_greater1_flag[ 1 ]                        ae(v)
    if( abs_mvd_greater0_flag[ 0 ] ) {
        if( abs_mvd_greater1_flag[ 0 ] )
            abs_mvd_minus2[ 0 ]                           ae(v)
        mvd_sign_flag[ 0 ]                                ae(v)
    }
    if( abs_mvd_greater0_flag[ 1 ] ) {
        if( abs_mvd_greater1_flag[ 1 ] )
            abs_mvd_minus2[ 1 ]                           ae(v)
        mvd_sign_flag[ 1 ]                                ae(v)
    }
  }
```

2.6.1 Symmetric MVD for Affine Bi-Prediction Coding

SMVD for affine mode is proposed. In this proposal, the concept of SMVD is extended to the coding of CPMVs for affine-coded blocks. In the following descriptions, such a method is called Affine SMVD.

3. Drawbacks of Existing Implementations

In some existing implementations, SMVD and affine SMVD modes have been introduced to reduce the overhead for coding MVDs. Furthermore, AMVR and affine AMVR modes are targeting the same goal. However, the interaction between these two different types of modes is not well defined.

4. Example Methods for Interactions Between MV Precisions and MV Coding

Embodiments of the presently disclosed technology overcome the drawbacks of existing implementations, thereby providing video coding with higher coding efficiencies. The interactions between motion vector precisions and motion vector coding, based on the disclosed technology, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined.

In this disclosure (and the examples below) the terms 'affine SMVD' and 'affine AMVR' are applied to blocks coded with affine mode, whereas other terms like 'SMVD' and 'AMVR' are applied to non-affine coded blocks. Furthermore, lower MVD precision means a coarser MVD precision; e.g., 1-pel MVD precision is lower than ¼-pel MVD precision. Higher MVD precision means a finer MVD precision; e.g., 1/16-pel MVD precision is higher than ¼-pel MVD precision.

1. Whether to enable SMVD and/or how to apply SMVD for a block may depend on the motion information, and/or MVD precisions and/or MV precisions for the block.
    a. In one example, SMVD may be disabled for some CUs depending on the MVD precision etc.
        i. In one example, SMVD may be disabled when MVD precision is lower than or equal to a precision (for example, integer-pel precision).
        ii. In one example, SMVD may be disabled when MVD precision is higher than or equal to a precision (for example, integer-pel precision).
        iii. Alternatively, some MVD precisions may be disabled when SMVD is applied. For example, 4-pel precision MVD may be disabled in SMVD mode.
        iv. Alternatively, furthermore, signalling of the MVD precision (AMVR indications) may depend on the usage of SMVD.
            1. In one example, when SMVD is disabled for one MVD precision, the signalling of MDV precision (e.g., amvr_mode for non-affine inter mode in the specification) may be modified accordingly.
            2. In one example, if one MVD precision is disallowed when SMVD is enabled, only one bin may be coded for the AMVR mode.
    b. In one example, SMVD may be disabled when all MVD components of prediction 0 or/and 1 are zero.
    c. In one example, SMVD mode may be signaled after the motion information of the prediction direction 0 or 1.
        i. In one example, SMVD mode is not signaled if all MVD components of prediction direction 0 or 1 are zero.
        ii. In one example, SMVD mode is not signaled if absolute value of horizontal or/and vertical MVD component of prediction direction 0 or 1 is smaller than a threshold.
        iii. In one example, SMVD mode is not signaled if absolute sum of horizontal and vertical MVD component of prediction direction 0 or 1 is smaller than a threshold.
        iv. In one example, SMVD mode is not signaled if absolute value of horizontal or/and vertical MVD component of prediction direction 0 or 1 is greater than a threshold.
        v. In one example, SMVD mode is not signaled if absolute sum of horizontal and vertical MVD component of prediction direction 0 or 1 is greater than a threshold.
        vi. When SMVD mode is not signaled, it may be derived as false implicitly, e.g., SMVD mode is not applied.
2. Whether to enable affine SMVD and/or how to apply SMVD for an affine coded block may depend on the affine motion information, and/or MVD precisions and/or MV precisions for the block.
    a. In one example, Affine SMVD may be disabled for some CUs depending on affine MVD precision etc.
        i. In one example, affine SMVD may be disabled when affine MVD precision is lower than or equal to a precision (for example, integer-pel precision).
        ii. In one example, affine SMVD may be disabled when affine MVD precision is higher than or equal to a precision (for example, integer-pel precision).
        iii. Alternatively, some affine MVD precisions may be disabled when SMVD is applied. For example, integer-pel precision affine MVD may be disabled in SMVD mode.
        iv. Alternatively, furthermore, signalling of the affine MVD precision (affine AMVR indications) may depend on the usage of SMVD.
            1. In one example, furthermore, when SMVD is disabled for one MVD precision, the signalling of MDV precision (e.g., amvr_mode for affine inter mode in the specification) may be modified accordingly.
            2. In one example, if one MVD precision is disallowed when SMVD is enabled, only one bin may be coded for the AMVR mode.
    b. In one example, affine SMVD may be disabled when all affine MVD components of prediction 0 or/and 1 are zero.
    c. In one example, affine SMVD mode may be signaled after the motion information of the prediction direction 0 or 1.
        i. In one example, affine SMVD mode is not signaled if all affine MVD components of prediction direction 0 or 1 are zero.
        ii. In one example, affine SMVD mode is not signaled if absolute value of horizontal or/and vertical affine MVD component of N (N>=1) control points in prediction direction 0 or 1 is smaller than a threshold.
        iii. In one example, SMVD mode is not signaled if absolute sum of horizontal and vertical affine MVD component of N (N>=1) control points in prediction direction 0 or 1 is smaller than a threshold.
        iv. In one example, affine SMVD mode is not signaled if absolute value of horizontal or/and vertical affine MVD component of N (N>=1) control points in prediction direction 0 or 1 is greater than a threshold.
        v. In one example, SMVD mode is not signaled if absolute sum of horizontal and vertical affine MVD component of N (N>=1) control points in prediction direction 0 or 1 is greater than a threshold.
        vi. When affine SMVD mode is not signaled, it may be derived as false implicitly, i.e., affine SMVD mode is not applied.
3. The signaling of motion vector differences may depend on the usage of SMVD/affine SMVD.
    a. In one example, when SMVD is enabled for one block and the horizontal component of the motion vector difference is equal to 0, the vertical component of the motion vector difference shall be not equal to 0.

b. In one example, the vertical component of the motion vector difference (e.g., abs_mvd_greater0_flag [1]) may be conditionally signaled.

i. In one example, the signalling of the vertical component may depend on whether SMVD or affine SMVD is enabled for current block.

ii. In one example, the signalling of abs_mvd_greater0_flag [1] may depend on the following conditions:

1. SMVD flag (or Affine SMVD) is true and the value of horizontal component of the motion vector difference is not equal to 0 (e.g., abs_mvd_greater0_flag [0] is true); or SMVD flag (or Affine SMVD) is false.

2. When the above conditions are false, the signalling of abs_mvd_greater0_flag [1] is skipped. a. In this case, abs_mvd_greater0_flag [1] may be derived to be true implicitly.

4. The set of allowed MVD precisions may depend on the usage of SMVD.

a. The set of allowed affine MVD precisions may depend on the usage of affine SMVD.

b. In one example, when SMVD (or affine SMVD) is enabled, lower MVD precisions may be allowed, such as (¼-pel, 2-pel, 8-pel).

c. In one example, when SMVD (or affine SMVD) is enabled, higher MVD precisions may be allowed, such as (¼-pel, ½-pel, ⅛-pel).

5. Whether to enable or disable the above methods may be signaled in sequence parameter set (SPS)/picture parameter set (PPS)/video parameter set (VPS)/sequence header/picture header/slice header/tile group header/tile/group of CTUs, etc.

a. Alternatively, which method to be used may be signaled in SPS/PPS/VPS/sequence header/picture header/slice header/tile group header/tile/group of CTUs, etc.

b. Alternatively, whether to enable or disable the above methods and/or which method to be applied may be dependent on block dimension, Virtual Pipelining Data Units (VPDU), picture type, low delay check flag, coded information of current block (such as reference pictures, uni or bi-prediction) or previously coded blocks.

The examples described above may be incorporated in the context of the method described below, e.g., method 1900, which may be implemented at a video decoder or a video encoder.

Figure 19:
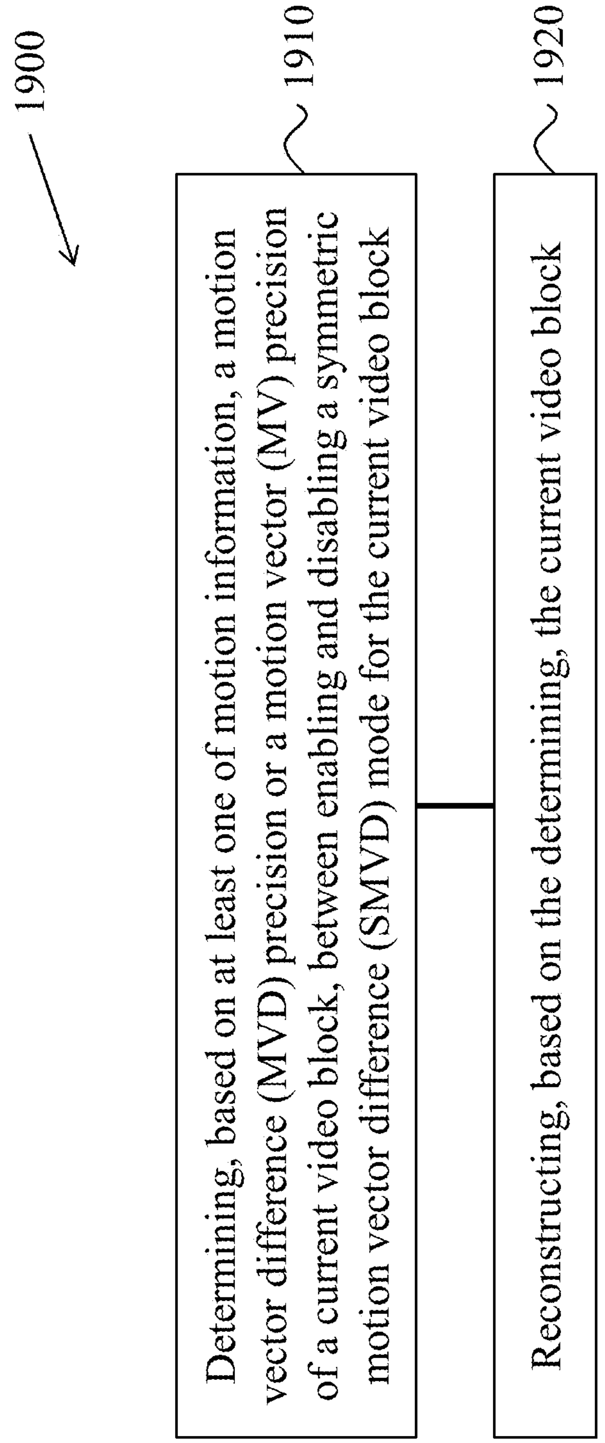
FIG. 19 shows a flowchart of an example method for video processing.

FIG. 19 shows a flowchart of an exemplary method for video processing. The method 1900 includes, at step 1910, determining, based on at least one of motion information, a motion vector difference (MVD) precision or a motion vector (MV) precision of a current video block, between enabling and disabling a symmetric motion vector difference (SMVD) mode for the current video block.

The method 1900 includes, at step 1920, reconstructing, based on the determining, the current video block.

In some embodiments, the SMVD mode is disabled due to the MVD precision being lower than or equal to a threshold precision. In other embodiments, the SMVD mode is disabled due to the MVD precision being higher than equal to a threshold precision. In an example, the threshold precision is an integer-pel precision.

In some embodiments, the SMVD mode is disabled due to all MVD components of a first or second prediction direction of the current video block being zero.

In some embodiments, the SMVD mode is signaled after motion information of a first or second prediction direction of the current video block. In an example, an absolute value of a horizontal or vertical MVD component of the first or second prediction direction is lower than an MVD threshold. In another example, an absolute value of a horizontal or vertical MVD component of the first or second prediction direction is higher than an MVD threshold.

In some embodiments, signaling at least one MVD is based on the determining.

In some embodiments, the SMVD mode is enabled, and the MVD precision is ¼-pel, 2-pel or 8-pel. In other embodiments, the SMVD mode is enabled, and the MVD precision is ¼-pel, ½-pel or ⅛-pel.

In some embodiments, the determining is further based on signaling in a sequence parameter set (SPS), a picture parameter set (PPS), a video parameter set (VPS), a tile group header, a slice header, a sequence header, a picture header, a tile or a group of coding tree units (CTUs).

In some embodiments, the determining is further based on a height or a width of the current video block, a virtual pipelining data unit (VPDU) picture type, a low-delay check flag or coding information associated with the current video block or previously coded blocks.

In some embodiments, and in the context of Example 2 and with reference to method 1900, the motion information is affine motion information, the MVD precision is an affine MVD precision, the MV precision is an affine MV precision, and the SMVD mode is an affine SMVD mode.

5. Example Implementations of the Disclosed Technology

Figure 20:
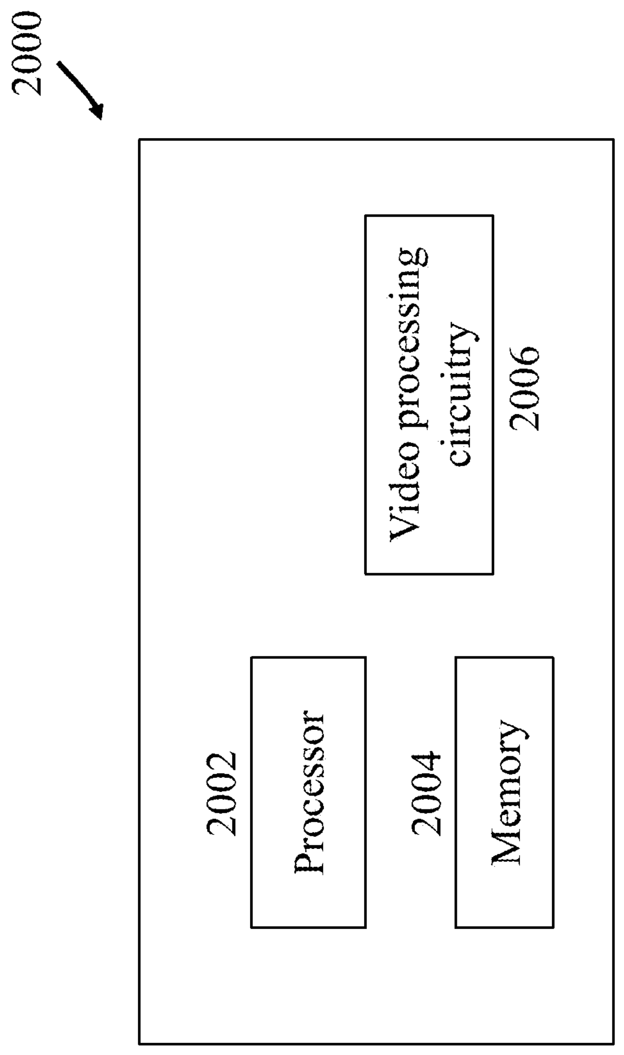
FIG. 20 is a block diagram of an example of a hardware platform for implementing a visual media decoding or a visual media encoding technique described in the present disclosure.

FIG. 20 is a block diagram of a video processing apparatus 2000. The apparatus 2000 may be used to implement one or more of the methods described herein. The apparatus 2000 may be embodied in a smartphone, tablet, computer, Internet of Things (IoT) receiver, and so on. The apparatus 2000 may include one or more processors 2002, one or more memories 2004 and video processing hardware 2006. The processor(s) 2002 may be configured to implement one or more methods (including, but not limited to, method 1900) described in the present disclosure. The memory (memories) 2004 may be used for storing data and code used for implementing the methods and techniques described herein. The video processing hardware 2006 may be used to implement, in hardware circuitry, some techniques described in the present disclosure.

In some embodiments, the video coding methods may be implemented using an apparatus that is implemented on a hardware platform as described with respect to FIG. 20.

Figure 21:
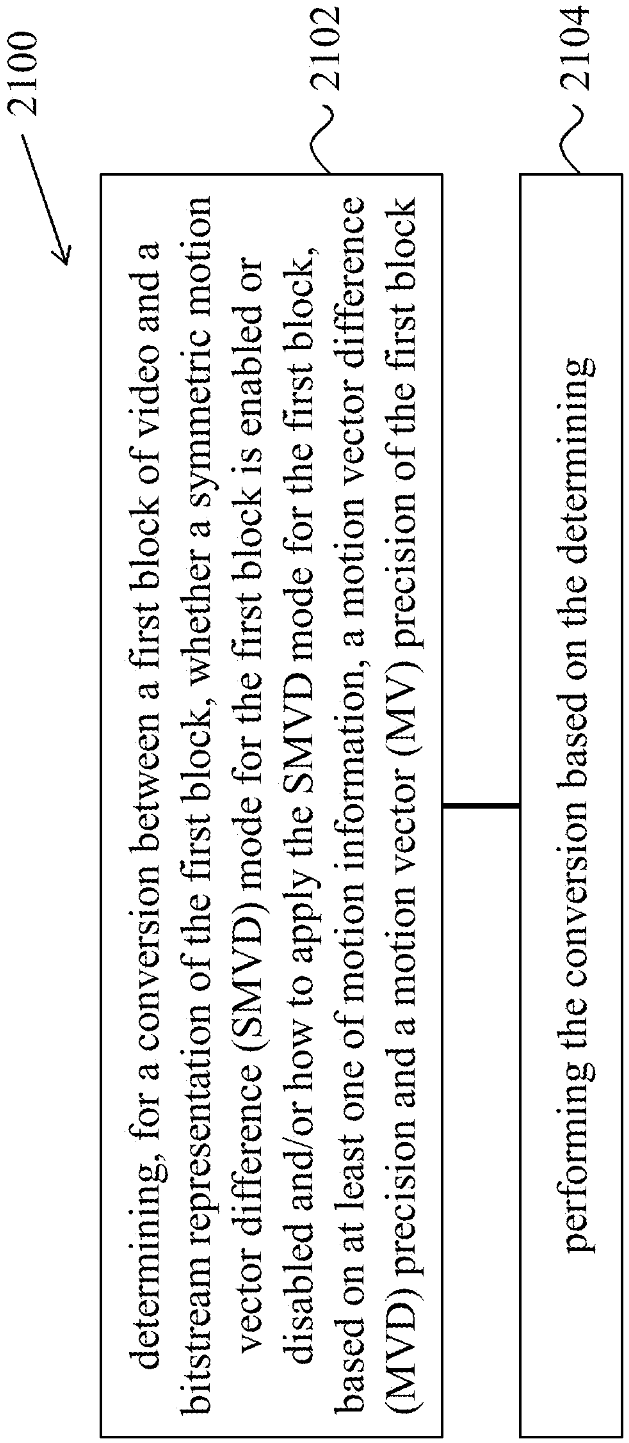
FIG. 21 shows a flowchart of an example method for video processing.

FIG. 21 is a flowchart for a method 2100 of processing video. The method 2100 includes, determining (2102), for a conversion between a first block of video and a bitstream representation of the first block, whether a symmetric motion vector difference (SMVD) mode for the first block is enabled or disabled and/or how to apply the SMVD mode for the first block, based on at least one of motion information, a motion vector difference (MVD) precision and a motion vector (MV) precision of the first block; and performing (2104) the conversion based on the determining.

In some examples, the SMVD mode is disabled for partial of coding units (CUs) depending on the MVD precision.

In some examples, the SMVD mode is disabled when the MVD precision is lower than or equal to a threshold precision.

In some examples, the SMVD mode is disabled when the MVD precision is higher than equal to a threshold precision.

In some examples, the threshold precision is an integer-pel precision.

In some examples, partial of the MVD precision are disabled when the SMVD mode is applied.

In some examples, signalling of the MVD precision depends on the usage of SMVD.

In some examples, when the SMVD mode is disabled for one MVD precision, the signalling of MVD precision is modified accordingly.

In some examples, if one MVD precision is disallowed when SMVD mode is enabled, only one bit is coded for an AMVR mode.

In some examples, the SMVD mode is disabled when all MVD components of reference picture list 0 and/or reference picture list 1 of the first block are zero.

In some examples, the SMVD mode is signaled after motion information of reference picture list 0 and/or reference picture list 1 of the first block.

In some examples, the SMVD mode is not signaled if all MVD components of reference picture list 0 or reference picture list 1 of the first block are zero.

In some examples, the SMVD mode is not signaled if absolute value of horizontal or/and vertical MVD component of reference picture list 0 or reference picture list 1 of the first block is less than a threshold.

In some examples, the SMVD mode is not signaled if absolute sum of horizontal and vertical MVD component of reference picture list 0 or reference picture list 1 of the first block is less than a threshold.

In some examples, the SMVD mode is not signaled if absolute value of horizontal or/and vertical MVD component of reference picture list 0 or reference picture list 1 of the first block is greater than a threshold.

In some examples, the SMVD mode is not signaled if absolute sum of horizontal and vertical MVD component of reference picture list 0 or reference picture list 1 of the first block is greater than a threshold.

In some examples, when SMVD mode is not signaled, the SMVD mode is not applied.

In some examples, signaling of the MVD depends on the determination whether the SMVD mode for the first block is enabled or disabled.

In some examples, when SMVD mode is enabled for the first block and the horizontal component of the MVD is equal to 0, the vertical component of the MVD is not equal to 0.

In some examples, the vertical component of the MVD is conditionally signaled.

In some examples, the signaling of the vertical component of the MVD depends on the determination whether the SMVD mode for the first block is enabled or disabled.

In some examples, the signaling of the indication of whether the vertical component of the MVD is non-zero depends on one of the following conditions: SMVD flag is true and the value of horizontal component of the MVD is not equal to 0; or SMVD flag is false.

In some examples, the signaling of the indication of whether the vertical component of the MVD is non-zero is skipped when the conditions are false.

In some examples, the vertical component of the MVD is implicitly derived to be non-zero.

In some examples, the set of allowed MVD precisions depends on the determination whether the SMVD mode for the first block is enabled or disabled.

In some examples, when the SMVD mode is enabled, lower MVD precisions are allowed, wherein the lower MVD precision includes at least one of ¼-pel, 2-pel and 8-pel.

In some examples, when the SMVD mode is enabled, higher MVD precisions are allowed, wherein the higher MVD precision is includes at least one of ¼-pel, ½-pel or ⅛-pel.

In some examples, the determining is further based on an indication signaled in a sequence parameter set (SPS), a picture parameter set (PPS), a video parameter set (VPS), a tile group header, a slice header, a sequence header, a picture header, a tile or a group of coding tree units (CTUs).

In some examples, the determining further depends on at least one of block dimension, a virtual pipelining data unit (VPDU), a picture type, a low-delay check flag or coding information associated with the first block or previously coded blocks.

In some examples, when the first block is coded with affine mode, the SMVD mode is affine SMVD mode, the motion information is affine motion information, the MVD precision is an affine MVD precision, the MV precision is an affine MV precision, and the SMVD MVD components are affine SMVD MVD components.

In some examples, the affine SMVD mode is not signaled if absolute value of horizontal or/and vertical affine MVD component of N control points in reference picture list 0 or reference picture list 1 of the first block is less than a threshold, N is an integer larger and/or equal to 1.

In some examples, the affine SMVD mode is not signaled if absolute sum of horizontal and vertical affine MVD component of N control points in reference picture list 0 or reference picture list 1 of the first block is less than a threshold, N is an integer larger and/or equal to 1.

In some examples, the affine SMVD mode is not signaled if absolute value of horizontal or/and vertical affine MVD component of N control points in reference picture list 0 or reference picture list 1 of the first block is greater than a threshold, N is an integer larger and/or equal to 1.

In some examples, the affine SMVD mode is not signaled if absolute sum of horizontal and vertical affine MVD component of N control points in reference picture list 0 or reference picture list 1 of the first block is greater than a threshold, N is an integer larger and/or equal to 1.

In some examples, the conversion generates the first block of video from the bitstream representation.

In some examples, the conversion generates the bitstream representation from the first block of video.

From the foregoing, it will be appreciated that specific embodiments of the presently disclosed technology have been described herein for purposes of illustration, but that various modifications may be made without deviating from the scope of the disclosure. Accordingly, the presently disclosed technology is not limited except as by the appended claims.

Implementations of the subject matter and the functional operations described in the present disclosure can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., erasable programmable read-only memory (EPROM), electrically erasable programmable read-only memory (EEPROM), and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While the present disclosure contains many specifics, these should not be construed as limitations on the scope of any invention or of what may be claimed, but rather as descriptions of features that may be specific to particular embodiments of particular inventions. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method of processing video data, comprising:

determining, for a conversion between a first block of a video and a bitstream of the first block, whether a symmetric motion vector difference (SMVD) mode for the first block is enabled or disabled, based on a motion vector difference (MVD) precision or a motion vector (MV) precision of the first block; and performing the conversion based on the determining, wherein the first block is coded with affine mode, the SMVD mode is an affine SMVD mode, the MVD precision is an affine MVD precision, and the MV precision is an affine MV precision, wherein signaling of a MVD depends on a determination whether the SMVD mode for the first block is enabled or disabled, wherein:

when the SMVD mode is enabled for the first block and a horizontal component of the MVD is equal to 0, a vertical component of the MVD is not equal to 0, or the vertical component of the MVD is conditionally signaled, wherein the signaling of the vertical component of the MVD depends on the determination whether the SMVD mode for the first block is enabled or disabled, and/or the signaling of an indication of whether the vertical component of the MVD is non-zero depends on one of the following conditions: an SMVD flag is true and a value of the horizontal component of the MVD is not equal to 0, or the SMVD flag is false, and wherein the signaling of the indication of whether the vertical component of the MVD is non-zero is skipped when the conditions are false, and wherein the vertical component of the MVD is implicitly derived to be non-zero.

2. The method of claim 1, wherein the SMVD mode is disabled for partial coding units (CUs) depending on the MVD precision.

3. The method of claim 1, wherein the SMVD mode is disabled when the MVD precision is lower than or equal to a threshold precision.

4. The method of claim 1, wherein the SMVD mode is disabled when the MVD precision is higher than or equal to a threshold precision.

5. The method of claim 3, wherein the threshold precision is an integer-pel precision.

6. The method of claim 4, wherein the threshold precision is an integer-pel precision.

7. The method of claim 1, wherein partial MVD precisions are disabled when the SMVD mode is applied.

8. The method of claim 1, wherein signalling of the MVD precision depends on usage of the SMVD mode.

9. The method of claim 8, wherein when the SMVD mode is disabled for one MVD precision, the signalling of the MVD precision is modified accordingly; and/or when one MVD precision is disallowed when the SMVD mode is enabled, only one bit is coded for an adaptive motion vector resolution (AMVR) mode.

10. The method of claim 1, wherein the SMVD mode is disabled when all MVD components of reference picture list 0 and/or reference picture list 1 of the first block are zero.

11. The method of claim 1, wherein the SMVD mode is signaled after motion information of reference picture list 0 and/or reference picture list 1 of the first block.

12. The method of claim 1, wherein a set of allowed MVD precisions depends on the determination whether the SMVD mode for the first block is enabled or disabled, wherein:

when the SMVD mode is enabled, lower MVD precisions are allowed, wherein the lower MVD precision includes at least one of ¼-pel, 2-pel and 8-pel, or when the SMVD mode is enabled, higher MVD precisions are allowed, wherein the higher MVD precision includes at least one of ¼-pel, ½-pel or ⅛-pel.

13. The method of claim 1, wherein the determining is further based on an indication signaled in a sequence parameter set (SPS), a picture parameter set (PPS), a video parameter set (VPS), a tile group header, a slice header, a sequence header, a picture header, a tile or a group of coding tree units (CTUs), or wherein the determining further depends on at least one of block dimension, a virtual pipelining data unit (VPDU) picture type, a low-delay check flag or coding information associated with the first block or previously coded blocks.

14. The method of claim 1, wherein motion information of the first block is affine motion information, and SMVD MVD components are affine SMVD MVD components, wherein:

the SMVD mode is not signaled when all MVD components of reference picture list 0 or reference picture list 1 of the first block are zero, the SMVD mode is not signaled when absolute value of horizontal or/and vertical affine MVD component of N control points in reference picture list 0 or reference picture list 1 of the first block is less than a threshold, Nis an integer larger than or equal to 1, or the SMVD mode is not signaled when absolute sum of horizontal and vertical affine MVD component of N control points in reference picture list 0 or reference picture list 1 of the first block is less than a threshold, N is an integer larger than or equal to 1, or the SMVD mode is not signaled when absolute value of horizontal or/and vertical affine MVD component of N control points in reference picture list 0 or reference picture list 1 of the first block is greater than a threshold, Nis an integer larger than or equal to 1, or the SMVD mode is not signaled when absolute sum of horizontal and vertical affine MVD component of N control points in reference picture list 0 or reference picture list 1 of the first block is greater than a threshold, Nis an integer larger than or equal to 1, and wherein when the SMVD mode is not signaled, the SMVD mode is not applied.

15. The method of claim 1, wherein the conversion includes encoding the first block into the bitstream.

16. The method of claim 1, wherein the conversion includes decoding the first block from the bitstream.

17. An apparatus for processing video data comprising a processor and a non-transitory memory with instructions thereon, wherein the instructions upon execution by the processor cause the processor to:

determine, for a conversion between a first block of a video and a bitstream of the first block, whether a symmetric motion vector difference (SMVD) mode for the first block is enabled or disabled, based on a motion vector difference (MVD) precision or a motion vector (MV) precision of the first block; and perform the conversion based on the determination, wherein the first block is coded with affine mode, the SMVD mode is an affine SMVD mode, the MVD precision is an affine MVD precision, and the MV precision is an affine MV precision, wherein signaling of a MVD depends on a determination whether the SMVD mode for the first block is enabled or disabled, wherein:

when the SMVD mode is enabled for the first block and a horizontal component of the MVD is equal to 0, a vertical component of the MVD is not equal to 0, or the vertical component of the MVD is conditionally signaled, wherein the signaling of the vertical component of the MVD depends on the determination whether the SMVD mode for the first block is enabled or disabled, and/or the signaling of an indication of whether the vertical component of the MVD is non-zero depends on one of the following conditions: an SMVD flag is true and a value of the horizontal component of the MVD is not equal to 0, or the SMVD flag is false, and wherein the signaling of the indication of whether the vertical component of the MVD is non-zero is skipped when the conditions are false, and wherein the vertical component of the MVD is implicitly derived to be non-zero.

18. A method for storing a bitstream of a video, comprising:

determining, for a first block of the video, whether a symmetric motion vector difference (SMVD) mode for the first block is enabled or disabled, based on a motion vector difference (MVD) precision or a motion vector (MV) precision of the first block;

generating the bitstream based on the determining, and storing the bitstream in a non-transitory computer-readable recording medium, wherein the first block is coded with affine mode, the SMVD mode is an affine SMVD mode, the MVD precision is an affine MVD precision, and the MV precision is an affine MV precision, wherein signaling of a MVD depends on a determination whether the SMVD mode for the first block is enabled or disabled, wherein:

when the SMVD mode is enabled for the first block and a horizontal component of the MVD is equal to 0, a vertical component of the MVD is not equal to 0, or the vertical component of the MVD is conditionally signaled, wherein the signaling of the vertical component of the MVD depends on the determination whether the SMVD mode for the first block is enabled or disabled, and/or the signaling of an indication of whether the vertical component of the MVD is non-zero depends on one of the following conditions: an SMVD flag is true and a value of the horizontal component of the MVD is not equal to 0, or the SMVD flag is false, wherein the signaling of the indication of whether the vertical component of the MVD is non-zero is skipped when the conditions are false, and wherein the vertical component of the MVD is implicitly derived to be non-zero.

* * * * *